United States Patent [19]

Inoue

[11] Patent Number: 5,717,190
[45] Date of Patent: Feb. 10, 1998

[54] TRANSPARENT HEATING PLATE FOR EXAMINATION OF SPECIMENS AND TRANSPARENT HEATING DEVICE FOR USE THEREWITH

[75] Inventor: Tamotsu Inoue, Shizuoka, Japan

[73] Assignee: Kabushiki Kaisha Kitazato Supply, Shizuoka, Japan

[21] Appl. No.: 578,677

[22] PCT Filed: Apr. 27, 1995

[86] PCT No.: PCT/JP95/00842

§ 371 Date: Dec. 28, 1995

§ 102(e) Date: Dec. 28, 1995

[87] PCT Pub. No.: WO95/30168

PCT Pub. Date: Nov. 9, 1995

[30] Foreign Application Priority Data

Apr. 30, 1994 [JP] Japan ................... 6-113540

[51] Int. Cl.$^6$ ........................................ H05B 3/06
[52] U.S. Cl. ................... 219/522; 219/542; 359/512
[58] Field of Search ........................ 219/203, 522, 219/542, 544, 548; 338/308–309, 306; 52/171.2; 359/512

[56] References Cited

U.S. PATENT DOCUMENTS

| | | |
|---|---|---|
| 3,833,451 | 9/1974 | Wagner ................... 219/522 |
| 4,361,751 | 11/1982 | Criss et al. ................... 219/522 |
| 4,820,902 | 4/1989 | Gillery ................... 219/203 |
| 4,844,985 | 7/1989 | Pharms et al. ................... 219/203 |
| 4,918,288 | 4/1990 | Carter et al. ................... 219/203 |
| 4,957,358 | 9/1990 | Terada et al. ................... 219/522 |

FOREIGN PATENT DOCUMENTS

| | | |
|---|---|---|
| 60-156520 | 10/1985 | Japan . |
| 3-101894 | 10/1991 | Japan . |
| WO 87/03703 | 6/1987 | WIPO . |

*Primary Examiner*—Teresa J. Walberg
*Assistant Examiner*—Raphael Valencia
*Attorney, Agent, or Firm*—Burns, Doane, Swecker & Mathis

[57] ABSTRACT

A transparent heating plate and transparent heating device for examination of specimens under a microscope can heat the entire transparent conductive film between electrodes of the transparent heating plate with a small difference in temperature. The transparent heating plate can also heat the vicinity of the center of the transparent heating plate used for examination at substantially a uniform temperature regardless of the shape of the transparent heating plate or the structure of the transparent heating plate. The transparent heating plate may also prevent electromagnetic waves generated from the transparent heating plate from flowing into objects put on the outer side of the transparent heating plate. A further embodiment of a transparent heating plate prevents scattering of broken pieces of glass should the transparent heating plate break.

17 Claims, 25 Drawing Sheets

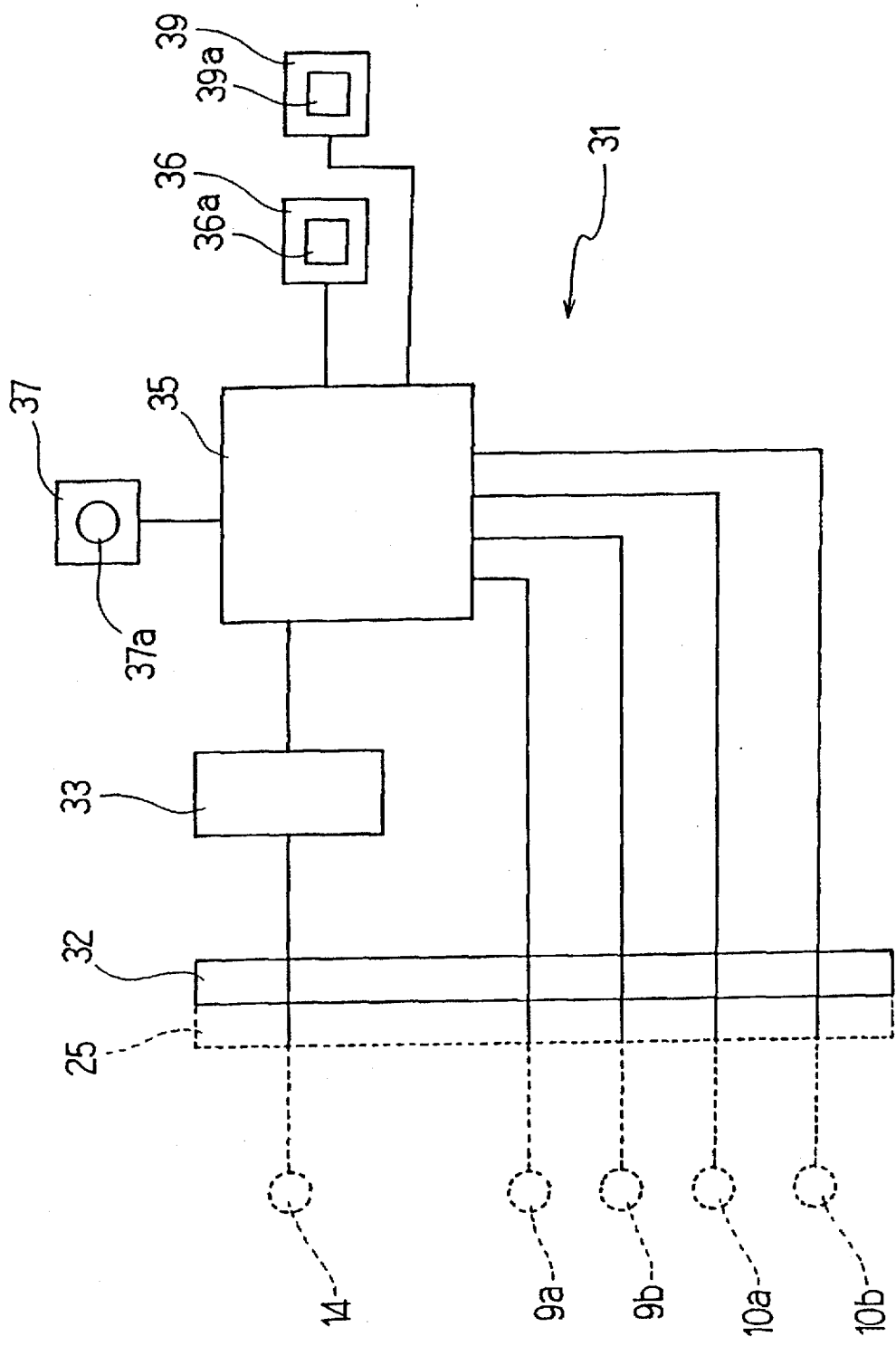

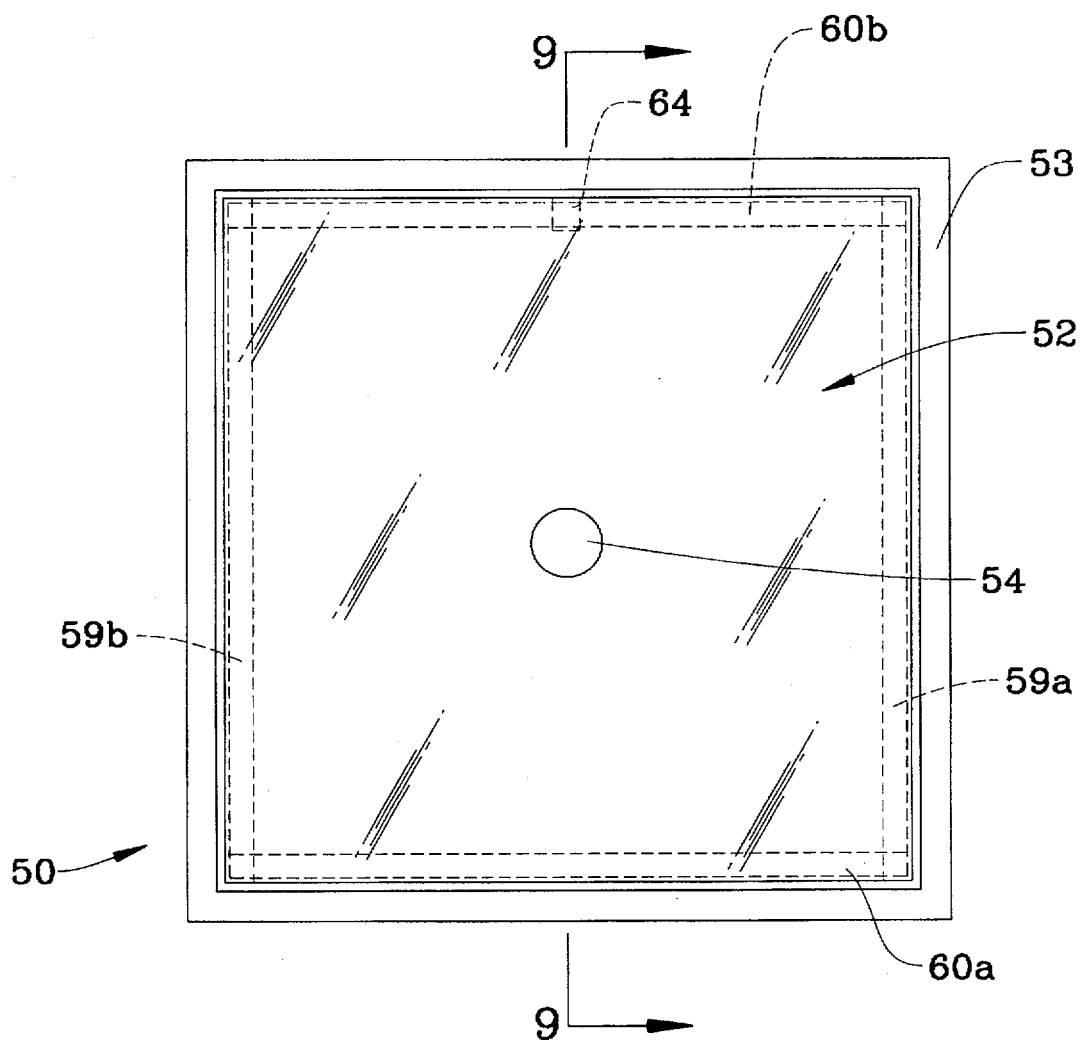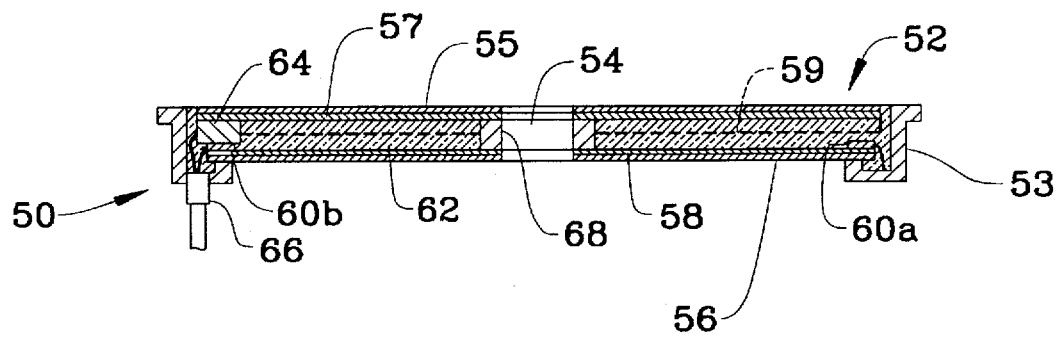

TRANSPARENT HEATING PLATE FOR EXAMINATION OF SPECIMENS AND TRANSPARENT HEATING DEVICE FOR USE THEREWITH

FIELD OF THE INVENTION

This invention relates to a transparent heating plate and a transparent heating device for heating an object examined or a culture dish, put on them. Specifically, this invention relates to a transparent heating plate which is attached to or put on the stage of a microscope and used for examination of a specimen under a microscope. More specifically, this invention relates to a transparent heating plate for microscope and transparent heating device for microscope which can control the temperature of a specimen to its optimum temperature.

BACKGROUND ART

Artificial insemination is conventionally put in practice for breeding of a stock. It also has been put in practice for the human race for the purpose of treating infertility. For such artificial insemination, it is necessary to examine the vitality and appearance of the sperm to be introduced with a microscope and confirm the faultlessness of the sperm beforehand. Since sperm generally has the optimum activity at 37° to 38° C., though it varies according to the species of animals, it is preferable to perform the examination at this temperature.

For this purpose, the inventors of this invention proposed a heating device for microscopic examination described in J.P.A.62 (1987)-135,803. This heating device comprises a heater stage and a heating means. The heater stage has a transparent conductive film between top and bottom transparent glass plates.

Although the above device has a sufficient effect, request for a circular heater stage, for example, has recently arisen for the shape of the heater stage, corresponding to the configurations of microscopes. When a pair of opposite electrodes are formed along the circumference of the glass plate (transparent plate) in the circular transparent heating plate, regions without an electrode are formed outside the ends of the electrodes, and these regions are not heated Contrarily, cooling occurs from these regions not heated, which causes instability of the temperature on the central part of the plate or a nonuniform temperature distribution on the central part. The regions without an electrode outside the ends of the electrodes become smaller and the heated area increases by forming electrodes larger. However, since the distance between the ends of the electrodes which come closer to each other is smaller than that between the other part of the electrodes, a larger electric current flows and an excessive heating can occur. The phenomenon that the temperature between the ends of the electrodes becomes higher than that of the central part on the contrary to the above description, was discovered by the inventors.

The first object of this invention is to provide a transparent heating plate which can heat the entire transparent conductive film between the electrodes with a small difference of temperature, if it is a circular transparent heating plate.

Further, an inverted microscope recently has come into wide use. Since the lens system is disposed below the stage in an inverted microscope, it is preferable that a through hole is formed at the central part of the stage. By the through hole thus formed, checking of the magnification lens of an inverted microscope is made easier. Further, it is preferable to form a through hole at substantially the central part of the transparent heating plate for microscope, too. However, when a through hole is formed at substantially the central part of the transparent heating plate, the transparent heating element is cut, and the current flow in the transparent heating element around the hole becomes insufficient. Particularly, regions where the current flow is insufficient are formed at the part around the through hole opposite to each electrode, as ensured by the inventors. The inventors therefore considered that it is important to improve heating near the through hole, because the part used for examination is the vicinity of the center of the plate, and IN addition for reducing the effect of the cooling by air caused by forming the through hole as much as possible. This problem is caused by forming the through hole, it occurred regardless of the shape of the plate being a square or a circle.

The second object of this invention is to provide a transparent heating plate which can heat the vicinity of the center of the transparent heating plate used for examination at substantially a uniform temperature without effect of the shape of the transparent heating plate or the structure of the transparent heating plate such as a through hole being formed.

Further, in the transparent heating plate, the transparent heating plate is heated using the heat generation of the transparent heating element due to an electric current being flowed in the transparent heating element. For this reason, electromagnetic waves (noises) can be generated from the electrodes connected to the transparent heating element or other parts. If the electromagnetic waves flow into the object examined, it can change the properties of the object.

The third object of this invention is to provide a transparent heating plate which can prevent the electromagnetic waves generated from the transparent heating plate from flowing into the object put on the outer side of the transparent heating plate.

The inventors also propose an heat device for microscopic examination as stage and a heating means. The heater stage has a transparent conductive film between top and bottom transparent glass plates. The above device has a satisfactory performance, but pieces of glass can scatter if glass is broken by mistake during use.

The fourth object of this invention is to provide a transparent heating plate in which scattering of broken pieces of glasses is prevented if glass plates break.

DISCLOSURE OF THE INVENTION

The fist and second objects described above is attained by a transparent heating plate comprising a transparent plate assembly which comprises a first transparent plate, a second transparent plate put opposite to the first transparent plate with a space of predetermined distance, and a transparent insulative material filled between the first and second transaparent plates and a housing which holds the peripheral part of the transparent plate assembly, wherein said first transparent plate has a first transparent heating element formed on either side and a pair of electrodes for first heating element connected to said first transparent heating element and disposed opposite to each other, the second transaparent plate has a second transparent heating element formed on either side and a pair of electrodes for second heating element connected to the second transparent heating element and disposed opposite to each other, and the center line of the opposite electrodes for second heating element is oriented so as to intersect the center line of said opposite electrodes of first heating element substantially at right angles.

The third objects described above is attained by a transparent heating plate comprising a transparent plate assembly which comprises a first transparent plate, a second transparent plate put opposite to the first transparent plate with a space of predetermined distance, and a transparent insulative material filled between the first and second transparent plates and a housing which holds the peripheral part of the transparent plate assembly, which further comprises a transparent heating element formed on either one of the opposite inner sides of said first and second transparent plates, a pair of electrodes for heating element connected to the transparent heating element and disposed opposite to each other, and a region without an electrode founded along the entire circumference in the peripheral part of said transparent plate with the transparent heating element formed, said electrodes being disposed inward apart from the circumference of said transparent plate assembly.

The third objects described above is attained by a transparent heating plate comprising a transparent plate assembly which comprises a first transparent plate, a second transparent plate put opposite to the first transparent plate with a space of predetermined distance, and a transparent insulative material filled between the first and second transparent plates and a housing which holds the peripheral part of the transparent plate assembly, wherein a transparent heating film is formed on both of the opposite inner sides of said first and second transparent plates, a pair of electrodes for heating conductive film are formed on either one of said sides so as to be connected to the transparent heating film and disposed opposite to each other, and a grounding wire is connected to the transparent conductive film on the other side.

The third objects described above is attained by a transparent heating device comprising a transparent heating plate described above and a temperature controller provided with a temperature control mechanism which controls the temperature of the transparent heating film of the transparent heating plate using the temperature signal detected by said temperature sensor, in which said temperature control mechanism performs the temperature control by adjusting the applied voltage or electric current based on the temperature signal detected by said temperature sensor.

The fourth objects described above is attained by a transparent heating device comprising a transparent plate assembly which comprises a first glass plate, a second glass plate put opposite to the first glass plate in superposition with a space of predetermined distance, and a transparent insulative material filled between the first and second glass plates and a housing which holds the peripheral part of the transparent plate assembly, in which a transparent conductive film and a pair of electrodes for heating conductive film connected to the transparent conductive film and disposed opposite to each other are formed on either one of the opposite sides of said first and second glass plates, and said transparent conductive material has an adhesive property to the first and second glass plates.

Further, the first object described above is attained by a transparent heating plate comprising a circular transparent plate assembly which comprises a circular first transparent plate, a circular second transparent plate put opposite to the first transparent plate with a space of predetermined distance, and a transparent conductive material filled between the first and second transparent plates and a housing which holds the peripheral part of the transparent plate assembly, which further comprises a transparent conductive film formed on either side of said first or second transparent plate, a pair of curved electrodes for heating element connected to the transparent conductive film and formed opposite to each other on or near the circumferential part of the transparent plate, said transparent conductive fire being formed so that the resistance between the ends of one electrode and the ends of the other electrodes adjacent to said ends is substantially equal to the resistance between the middle part of one electrode and the middle part of the other electrode.

Further, the first object described above is attained by a circular transparent heating plate comprising a circular transparent plate assembly which comprises a circular first transparent plate, a circular second transparent plate put opposite to the first transparent plate with a space of predetermined distance, and a transparent insulative material filled between the first and second transparent plates and a housing which holds the peripheral part of the transparent plate assembly, which further comprises a transparent conductive film formed on either side of said first or second transparent plates, a pair of curved electrodes for heating elements connected to the transparent conductive film and formed opposite to each other on or near the circumferential part of the transparent plate, said transparent conductive film being formed so that the resistance between the middle part of one electrode and the middle part of the other electrode is smaller and the resistance of the other part is greater than that of the central part.

BRIEF DESCRIPTION OF THE DRAWINGS

FIG. 7 is the block diagram of the temperature controller used for the transparent heating device of this invention.

FIG. 8 is a plan view of the transaparent heating plate of another embodiment of this invention.

FIG. 9 is a cross-sectional view along the 9—9 line in FIG. 8.

BEST MODE FOR CARRYING OUT THE INVENTION

A transparent heating plate of this invention is described below using embodiments of this invention applied to a transparent heating plate for microscope. The transparent heating plate is a plate for mounting an object to be examined with a microscope on it, in other words.

Figure 1:
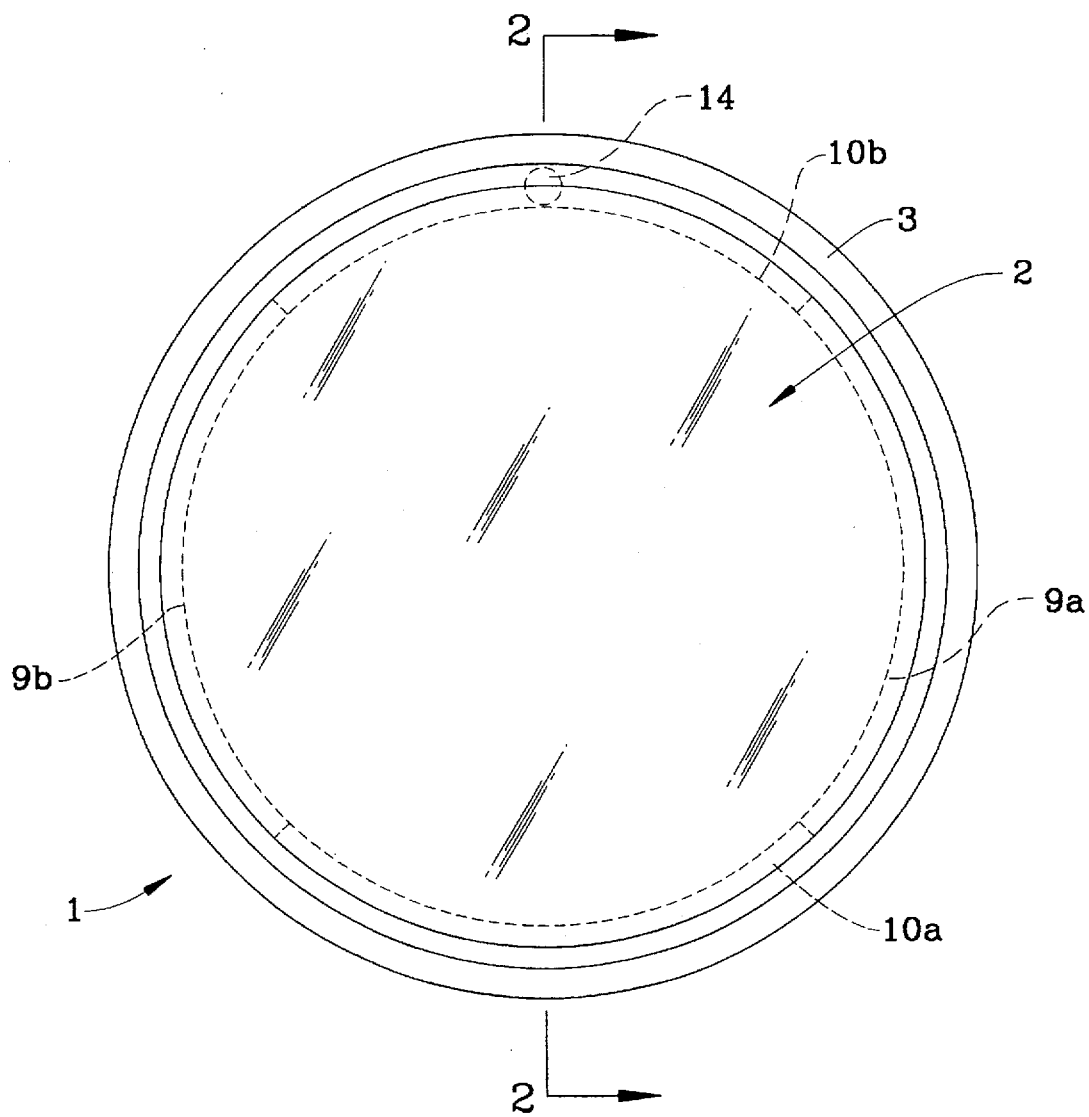
FIG. 1 is a plan view of the transparent heating plate of an embodiment of this, invention.
Figure 2:
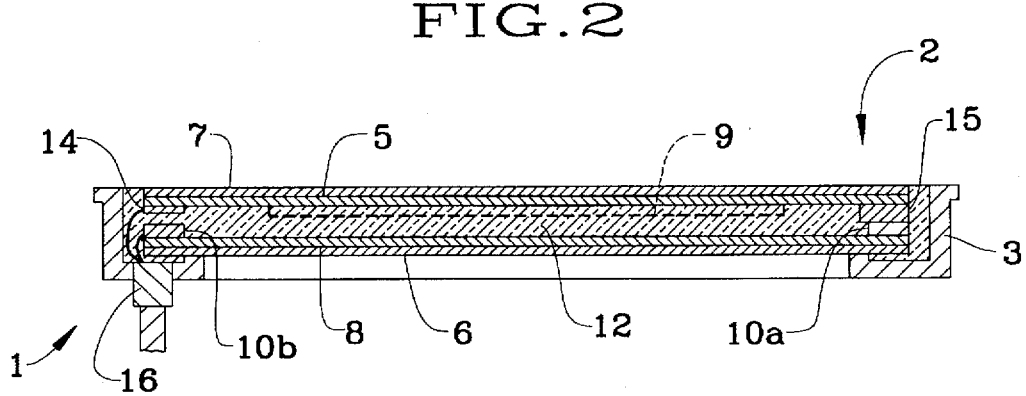
FIG. 2 is a cross-sectional view along the 2—2 line in FIG. 1.
Figure 3:
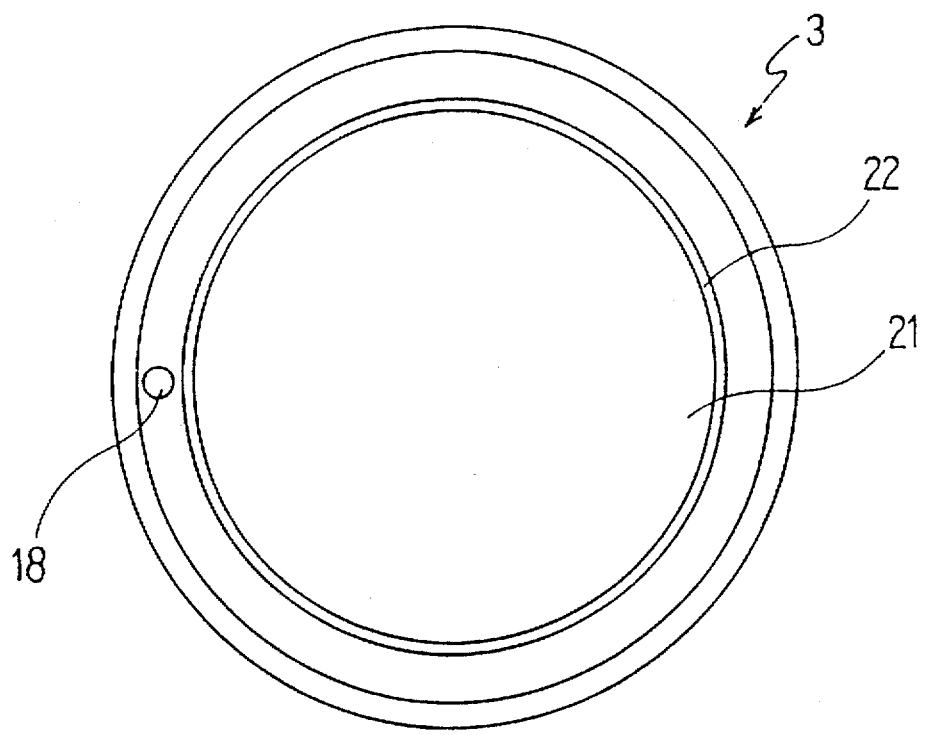
FIG. 3 is a plan view of the housing used for the transparent heating plate of this invention.
Figure 4:
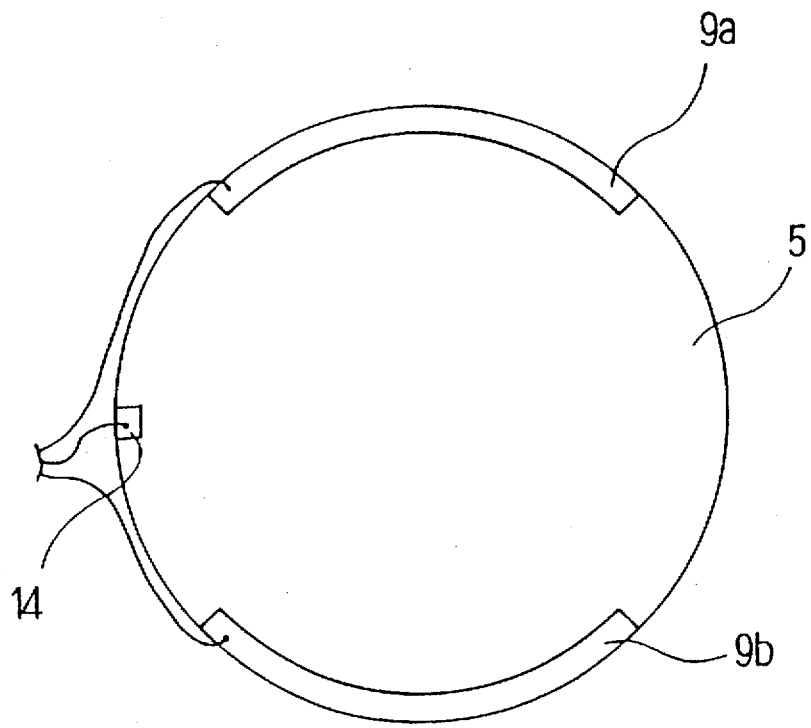
FIG. 4 is a plan view of the first transparent plate used for the transparent heating plate of this invention.
Figure 5:
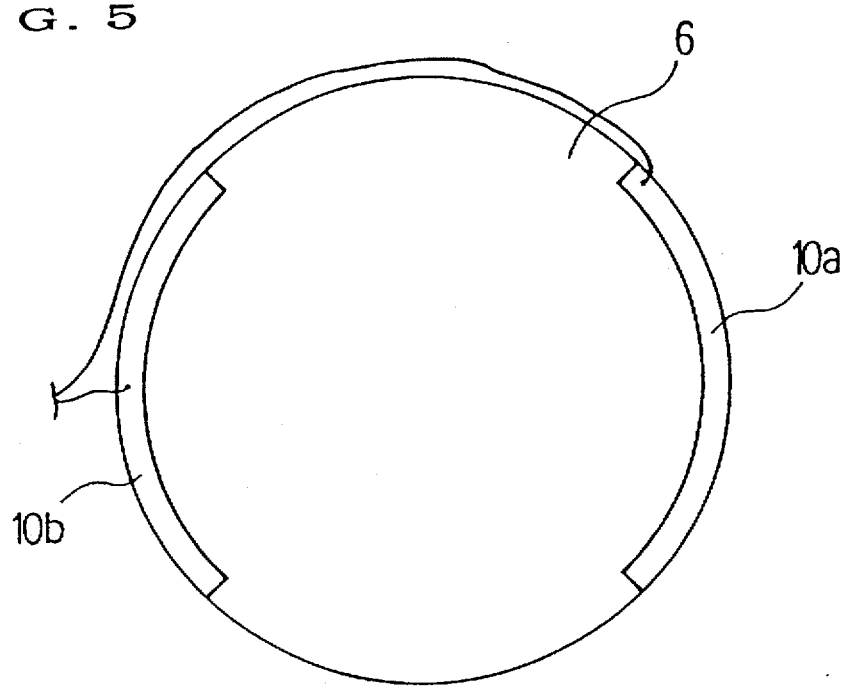
FIG. 5 is a plan view of the second transparent plate used for the transparent heating plate of this invention.
Figure 6:
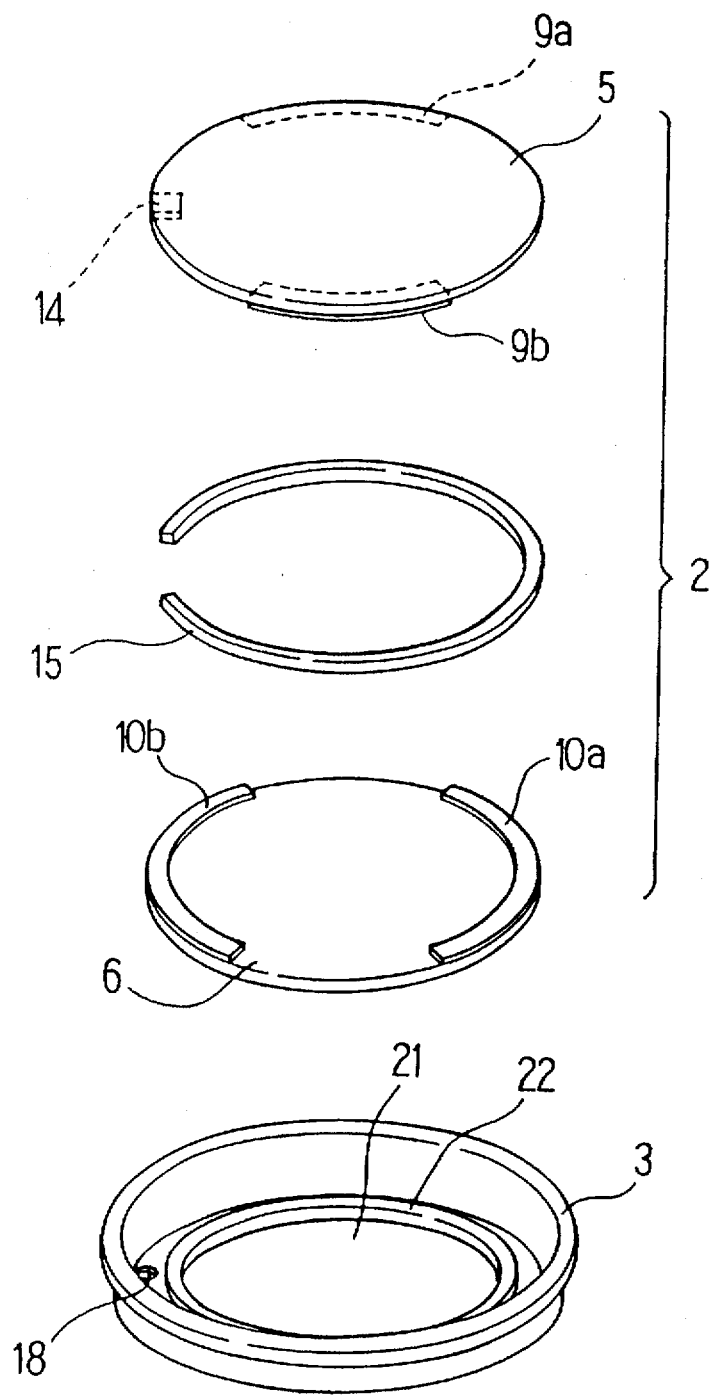
FIG. 6 is a perspective view which illustrates the structure of the assembled transparent heating plate of this invention.

FIG. 1 is a plan view of the transparent heating plate 1 of an embodiment of this invention. FIG. 2 is a cross-sectional view along the 2—2 line in FIG. 1. FIGS. 3 to 5 are plan views of each of the parts used for the transparent heating plate of this invention. FIG. 6 is a perspective view which illustrates the structure of the assembled transparent heating plate.

The transparent heating plate for microscope 1 of this embodiment comprises a transparent plate assembly 2 and a ring-shaped housing 3 which encased the transparent plate assembly 2.

The transparent plate assembly 2 comprises a first transparent plate 5, a second transparent plate 6 put opposite to the first transparent plate 5 with a predetermined distance between, and a transparent insulative material 12 filled between the first and second transparent plates 5 and 6. The housing which holds the peripheral part of the transparent plate assembly 2.

The first transparent plate 5 has a first transparent heating element 7 formed on either side thereof and a pair of electrodes for first heating element 9a and 9b connected to the first transparent heating element 7 and disposed opposite to each other. The second transparent plate 6 also has a second transparent heating element 8 formed on either side thereof and a pair of electrode for second heating element 10a and 10b connected to the second transparent heating element 8 and disposed opposite to each other. The center line of the opposite electrodes for second heating element 10a and 10b is oriented so as to intersect the center line of the opposite electrodes for first heating element 9a and 9b substantially at right angles. Specifically, the transparent heating plate for microscope 1 comprises a housing 3, a transparent plate assembly 2 encased in the housing 3, and a temperature sensor 14, as shown in FIGS. 1 to 6.

The transparent plate assembly 2 comprises a first transparent plate 5 and a second transparent plate 6, a spacer 15 put between the transparent plates 5 and 6, a transparent insulative filling material 12 filled between the first and second transparent plates 5 and 6, and a temperature sensor 14 put between the first and second transparent plates 5 and 6. The two transparent plates 5 and 6 are of about the same size and put in superposition. They are held apart about a uniform rate distance throughout by a spacer 15 put between the peripheral parts of the transparent plates 5 and 6. Transparent heating elements 7 and 8 are formed on the inner side of the transparent plates 5 and 6, respectively. The transparent heating elements 7 and 8 are prevented from short-circuiting by the transparent insulative filling material 12 filled between the transparent plates 5 and 6.

In this embodiment, the first and second transparent plates 5 and 6 are of a circle, and have the transparent heating elements 7 and 8 formed over almost the entire surface. The first transparent plate 5 is provided with two electrodes 9a and 9b, each in the shape of an arc of about one quarter of the circumference and disposed opposite to each other. The first transparent plate 5 has two regions without an electrode, each in the shape of an arc of about one quarter of the circumference and located opposite to each other. Further, the temperature sensor 14 is attached to this region without an electrode. Similarly, the second transparent plate 6 has two electrodes 10a and 10b, each in the shape of an arc of about one quarter of the circumference and disposed opposite to each other. The second transparent plate 6 also has two regions without electrode, each in the shape of an arc of about one quarter of the circumference and located opposite to each other.

The transparent plates 5 and 6 are put in superposition so that the electrodes 9a and 9b formed on the first transparent plate 5 and the electrodes 10a and 10b formed on the second transparent plate 6 substantially do not overlap, as shown in FIG. 6. By this, the center line of the electrodes 9a and 9b intersects that of the electrodes 10a and 10b substantially at right angles at the center of the plate. Intersection substantially at right angles here includes not only an intersection at right angles, but also an intersection at an angle within the range of 80 to 110 degrees.

The electrodes of each transparent plate is also prevented from coming into contact with the transparent heating element of the other transparent plate by a spacer 15 put between the transparent plates 5 and 6. By thus disposing electrodes, the transparent plate assembly 2 is enclosed by the four electrodes on almost the entire circumference, as shown in FIG. 1.

For the transparent plates 5 and 6, transparent and insulative plates made of glass or a synthetic resin are used. Any synthetic resin plates may be used without particular limitations if they have a transparency and an insulating property, but synthetic resin plates with a high transparency such as acrylic plates, polycarbonate plates, and styrene plates are preferable. Those with a high hardness are further preferable. Glass plates are preferable because of its high transparency and not so high heat conductivity.

The shape of the transparent plates is not limited to a circle described above. A circle here includes a true circle, ellipse, and elongated circle. It may be a polygon such as a rectangle and hexagon. On the shape of electrodes, all the electrodes formed 9a and 9b and 10a and 10b are preferably of the same size, but may be of different sizes. For example, the electrodes 9a and 9b of the first transparent plate 5 may be formed in a length greater than one quarter of the circumference (specifically, one third of the entire circumference), and the electrodes 10a and 10b of the second transparent plate 6 may be formed in a length smaller than one quarter of the whole circumference (specifically, one sixth of the entire circumference). Further, the transparent plate assembly must not necessarily be enclosed by the electrodes 9a and 9b and 10a and 10b on the circumference. For example, it is possible to form the electrodes 9a and 9b of the first transparent plate 5 in about one fifth of the entire circumference and the electrodes 10a and 10b of the second transparent plate 6 also in about one fitch of the entire circumference disposing them so that the center lines of both electrodes intersects each other substantially at right angles. In this structure, regions which are not heated are formed in the peripheral part of the transparent plate assembly. However, the central part of the transparent plate assembly has a good heated state.

The transparent heating elements 7 and 8 are formed of a conductive thin metal film. For the conductive thin metal film, one with the property of generating heat when an electric current is flowed in it is used. Specifically, tin oxide, $SiO_2$-mdium alloy, radium oxide, tin- or antimony-doped indium oxide, and antimony-doped tin oxide are preferable. To form a conductive thin metal film on the inner sides of the transparent plates 5 and 6, vapor deposition (vacuum deposition, for example), spattering, dipping, or CVD can be used.

For the electrodes 9a, 9b, 10a, and 10b, a thin film of a metal with a high conductivity such as copper and silver is preferably used. These electrodes and the temperature sensor are electrically connected to the temperature controller when used.

For the transparent and insulative filling material, silicone and polyurethane can be used, and those adhesive to the transparent plates are particularly preferable. Silicone is preferable because of its insulating property and stability. Silicone may be in silicone gel or silicone rubber. For silicone rubber, RTV silicone rubber and LTV silicone rubber with an adhesive property are preferable. Either one-liquid type or two-liquid type may be used.

The housing 3 has a hole 21 formed at the center, a transparent plate assembly mounting part 22 formed so as to surround the hole 21, and a small hole 18 for passing the wires connected to the electrodes and the temperature sensor through, as shown in FIGS. 3 to 6.

The temperature sensor 14 is disposed so as to be put in contact with the transparent plate assembly. Specifically, the temperature sensor 14 is disposed between the two transparent plates and in contact with the bottom side of the first transparent plate. Hence, the temperature sensor is located inside the transparent plate assembly. The temperature sensor may also be disposed on the top side or the bottom side of the transparent plate assembly. For the temperature sensor 14, any device with which the temperature can be detected may be used without particular limitations. A thermocouple and a thermistor are preferable.

The wires connected to the electrodes and the temperature sensor are bound into a cord 16 and extended to the outside through the small hole 18. The cord 16 is fitted with a connector (not shown) at the end. The connector forms the connection terminal connected to the temperature controller described later.

This transparent heating plate 1 is used being attached to the stage of a microscope. The temperature control device of this invention comprises the transparent heating plate 1 and a temperature controller 31. As shown in FIG. 7, the temperature controller 31 comprises a connector 32 which can be connected to the connector 25 of the transparent heating plate (specimen mounting plate for microscope) 1, an A/D converter 33 for converting the analog signal detected by the temperature sensor 14 into digital signals, a temperature controlling part 35 to which the signals from the A/D) converter 33 are input, a measured temperature displaying part 36 for displaying the temperature of the transparent plate assembly output from the temperature controlling part 35, an set temperature inputting part 37 for inputting a set temperature, a set temperature displaying part 39 for displaying the set temperature input from the set temperature inputting part.

The temperature controlling part 35 is electrically connected to the electrodes 9a, 9b, 10a, and 10b connected to the transparent heating elements 7 and 8 via the connector 35 of the temperature controller 1 and the connector 25 of the transparent heating plate 1. It has the function for controlling the temperature of the transparent heating elements 7 and 8. The set temperature inputting part 37 is provided with an input switch 37a. The measured temperature displaying part 36 is provided with a display window 36a, and the set temperature displaying part 39 is also provided with a display window 39a.

The temperature controlling part 35 has the comparison function that compares the measured temperature with the set temperature, and the temperature control function (power supply control function, in other words) that adjusts the electric power supplied to the heating elements based on the result of comparison by the comparison function. The temperature control function (power supply control function) may be a function which controls the applied voltage, a function which controls a load current, or a function which controls the ON/OFF state of the power supply.

Specifically, the temperature controlling part turns on the power supply to the transparent heating elements when the detected temperature is lower than the set temperature input from the set temperature inputting part, and turns it off when the detected temperature is higher than the set temperature input from the set temperature inputting part. The temperature control, when not On/OFF control, is performed by controlling so as to raise the voltage or current when the detected temperature is lower than the set temperature input from the set temperature inputting part, lowering the voltage or current or temporally stops the power supply when the detected temperature is higher than the set temperature input from the se temperature, and maintaining the voltage or current applied when the detected temperature is equal to the set temperature.

Figure 10:
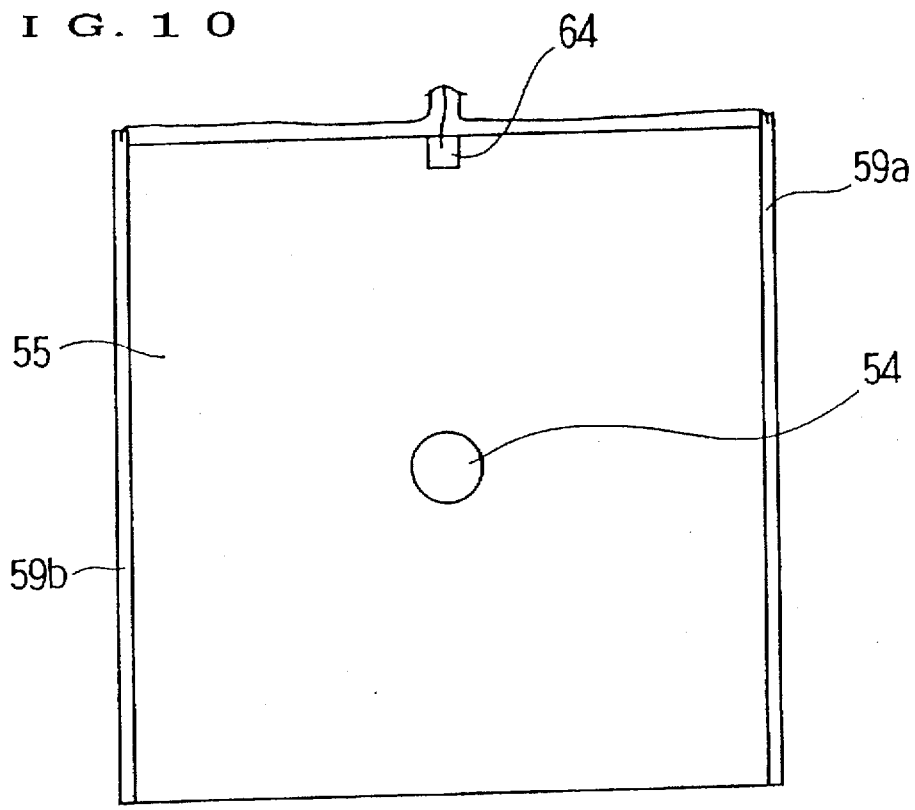
FIG. 10 is a plan view of the first transparent plate used for the transparent heating plate of this invention.
Figure 11:
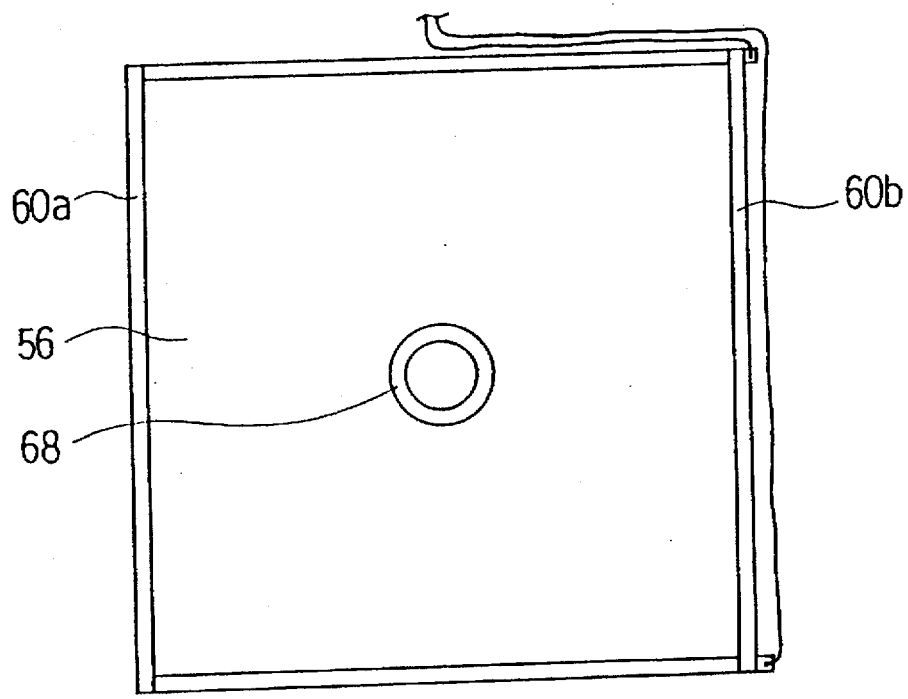
FIG. 11 is a plan view of the second transparent plate used for the transparent heating plate of this invention.
Figure 12:
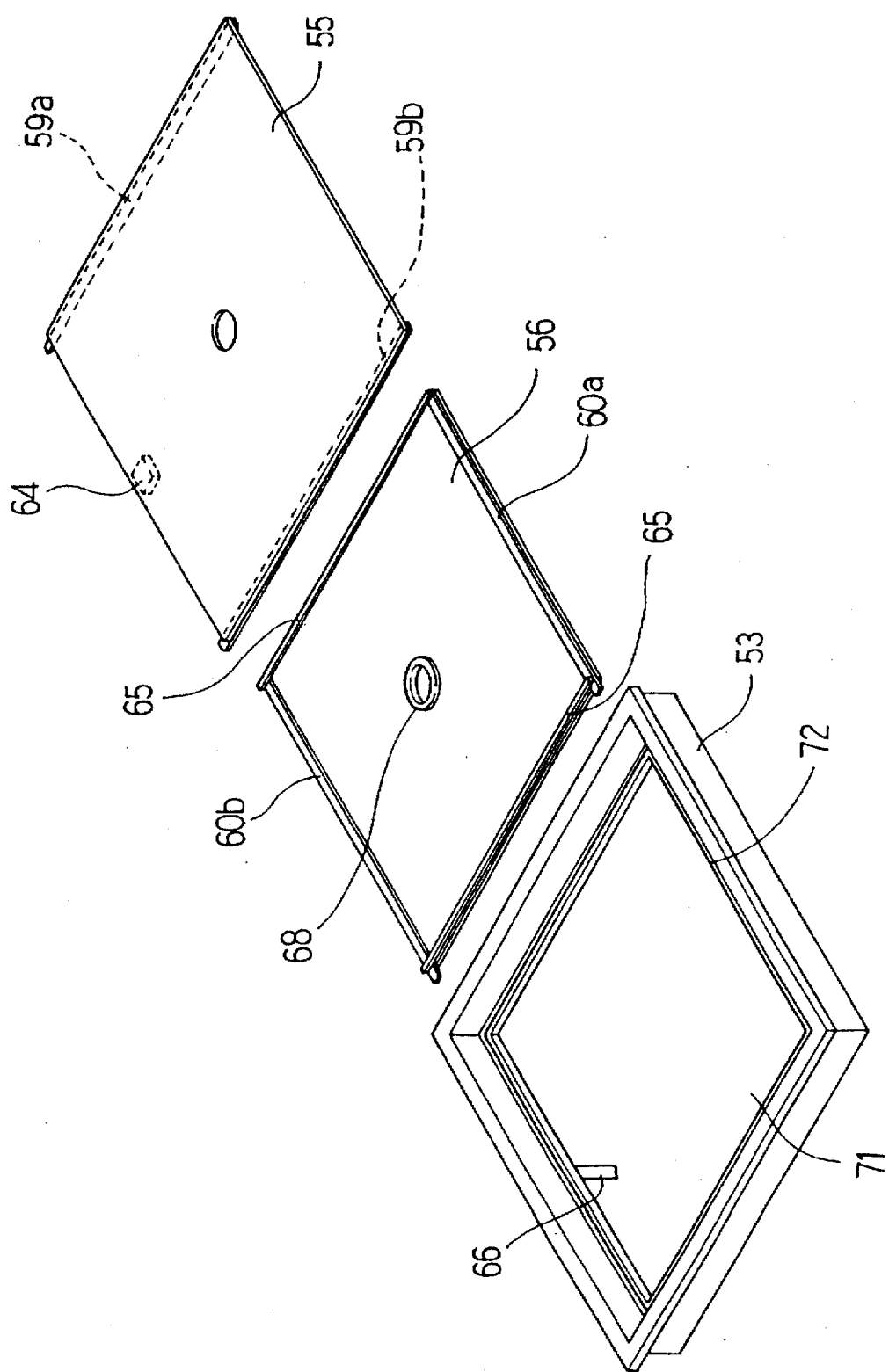
FIG. 12 is a perspective view which illustrates the structure of the assembled transparent heating plate of this invention.

Next, the transparent heating plate for microscope of another embodiment of this invention is described. FIG. 8 is a plan view of the transparent heating plate for microscope 50 of the embodiment. FIG. 9 is a sectional view along the 9—9 line in FIG. 8. FIGS. 10 and 11 are plan views of the parts used for the transparent heating plate of this embodiment. FIG. 12 is a perspective view of the structure of the assembled transparent heating plate.

The transparent heating plate for microscope 50 comprises a transparent plate assembly 52 and a rectangular housing 53 which holds the transparent plate assembly.

The transparent plate assembly 52 comprises a first transparent plate 55, a second transparent plate 56 put opposite to the first transparent plate 55 with a predetermined distance between, and a transparent insulative material 62 filled between the first and second transparent plates 55 and 56. The transparent plate assembly 52 has a through hole 54 at the center. The housing 53 holds the peripheral part of the transparent plate assembly 52. The through hole 54 in the transparent plate assembly 52 is used to check the lens of an inverted microscope from above.

The first transparent plate 55 has a first transparent heating element 57 formed on either side, a pair of electrodes for first heating element 59a and 59b connected to the first transparent heating element 57 and disposed opposite to each other, and a hole formed at the center. The second transparent plate 56 has a second transparent heating element 58 formed on either side, a pair of electrodes for second heating element 60a and 60b connected to the second transparent heating element 58 and disposed opposite to each other, and a hole formed at the center. The center line of the opposite electrodes 60a and 60b intersects that of the opposite electrodes 59a and 59b substantially at right angles. Since the electrodes are disposed so that the center lines of them intersects each other substantially at right angles, a good heated state is obtained at least at the central part.

Specifically, the transparent heating plate for microscope 50 comprises a housing 53, a transparent plate assembly 52 encased in the housing 53, and a temperature sensor 54, as shown in FIGS. 8 to 12. The transparent plate assembly 52 comprises a first transparent plate 55 and a second transparent plate 56, spacers 65 put between the transparent plates 55 and 56, a transparent insulative filling material 62 filled between the first and second transparent plates 55 and 56, and a temperature sensor 64 put between the first and second transparent plates 55 and 66, and has a through hole 54 at the center, as shown in FIGS. 8 to 12. The two transparent plates 55 and 56 are of about the same size, and put in superposition. They are held apart at about a uniform distance throughout the whole part by two spacers 65 disposed a little inward from the opposite sides of the transparent plates 55 and 56. Transparent heating elements 57 and 58 are formed on the opposed inner sides of the transparent plates 55 and 56. The transparent heating elements 57 and 58 are prevented from short-circuiting by the transparent insulative filling material 62 filled between the transparent plates 55 and 56.

In this embodiment, the first and second transparent plates 55 and 56 are substantially of a square. They have a hole at the center and transparent heating elements 57 and 58 formed on almost the entire surface. The first transparent plate 55 has two electrodes 59a and 59b, extending along almost the entire length of opposite sides and fitted to the square shape. Therefore, the other opposite sides of the first transparent plate 55 are parts where there is no electrode. A temperature sensor 64 is attached to this part without an electrode at about the middle position. Similarly the second transparent plate 56 has two electrodes 60a and 60b, extending along almost the entire length of opposite sides formed and fitted to its square shape. Also in the second transparent plate 56, the other opposite sides are parts where there is no electrode.

The transparent plates 56 and 57 are put in superposition so that the electrodes 59a and 59b of the first transparent plate 55 and the electrodes 60a and 60b of the second transparent plate 56 do not practically overlap except their end portions, as shown in FIGS. 8 to 12. By this, the center line of the electrodes 59a and 59b of the first transparent plate 55 and that of the electrodes 60a and 60b of the second transparent plate 56 intersect substantially at right angles of the plate. Intersection substantially at right angles here includes not only an intersection at right angles, but also an intersection at an angle within the range of 80 to 110 degrees.

Each electrode is also prevented from coming into contact with the transparent heating element formed on the opposite transparent plate by spacers 65 put between the transparent plates 55 and 56. By thus disposing electrodes, the transparent plate assembly 52 is enclosed by the four electrodes on an almost the entire circumference, as shown in FIG. 8. In addition, a ring-shaped spacer with an inside diameter equal to the diameter of the hole is put between the transparent plates 55 and 56 at the center.

For the material for forming the transparent plates 55 and 56, those described above are preferably used. The shape of the transparent plates is not limited to the square described above, and may be a four-sided figure such as a rectangle, and further a polygon such a hexagon, for example. Furthermore, it may be a circle. A circle here includes not only a true circle, but also an ellipse and an elongated circle. On the shape of electrodes, all the electrodes 59a and 59b and 60a and 60b formed are preferably of the same size, but not limited to this. For example, it is possible to form the electrodes 59a and 59b on the first transparent plate 55 shorter than the entire length of the opposite sides (about two thirds of the entire length at the middle part of the side, for example), and also the electrodes 60a and 60b on the second transparent plate 56 shorter than the entire length of the opposite sides (about two thirds of the entire length at the middle part of the side, for example). Further, the length of the electrodes 59a and 59b and that of the electrodes 60a and 60b may be different. When thus forming, regions which are not heated are formed in the peripheral part of the transparent plate assembly. However, the central part of the transparent plate assembly has a good heating state.

The transparent heating elements 57 and 58 are formed of a conductive thin metal film, For the conductive thin metal film has the property of generating heat when an electric current is flowed. For the conductive thin metal film, those described above are preferable. For the electrodes 59a, 59b, 60a, and 60b, a thin film of a metal with a high conductivity such as copper and silver is preferably used. The electrodes and the temperature sensor are electrically connected to the temperature controller when used. For the transparent and insulative filling material, those described above are preferably used.

The housing 53 has a hole 71 formed at the center, a transparent plate assembly mounting part 72 formed so as to surround the hole 71, and a small hole (not shown) for passing the wires connected to the electrodes and the temperature sensor through, as shown in FIGS. 9 to 12. The temperature sensor 64 is disposed so as to be put in contact with the transparent plate assembly. Specifically, it is positioned between the two transparent plates and put in contact with the bottom side of the first transparent plate. By this, the temperature sensor is located inside the transparent plate assembly. The temperature sensor may also be disposed on the top side or the bottom side of the transparent plate assembly. For the temperature sensor 64, any device with which the temperature can be detected may be used without particular limitations. A thermocouple and a thermistor are preferable. The wires connected to the electrodes and the temperature sensor are bound into a cord 66 and extended outside through the small hole in the housing 53. The cord 66 is fitted with a connector (not shown) at the end, which is connected to a temperature controller described later. The connector forms the connection terminal connected to the temperature controller described later.

The transparent heating plate 50 is used being attached to the stage of a microscope The heating device of this invention comprises the transparent heating plate for microscope 50 and a temperature controller. For the temperature controller, the one described above is preferably used. In the above description, embodiments which use two transparent plates for the transparent plate assembly are explained. In this embodiment, the transparent heating elements formed on the transparent plates are not exposed, and hence there is no problem of leakage preferably. However, the transparent heating plate of this invention is not necessarily limited to this structure.

For example, a transparent heating plate may comprise a transparent plate assembly which comprises a first transparent heating element formed on the outer side of a transparent plate and a second transparent heating element formed on the other side of the transparent plate and a housing which holds the peripheral part of the transparent plate assembly, and have a pair of electrodes for first heating element formed on the top side of the transparent plate so as to be connected to the first transparent heating element and disposed opposite to each other and a pair of electrodes for second heating element formed on the bottom side of the transparent plate so as to be connected to the second transparent heating element and disposed opposite to each other, the center line of the opposite electrodes for second heating element is oriented so as to intersect the center line of the opposite electrodes for first heating element substantially at right angles. The difference between this embodiment and the embodiments described above is only that transparent heating elements and corresponding electrodes are formed on both sides of one transparent plate in this embodiment. The other structure is the same as that of the above embodiments.

Figure 13:
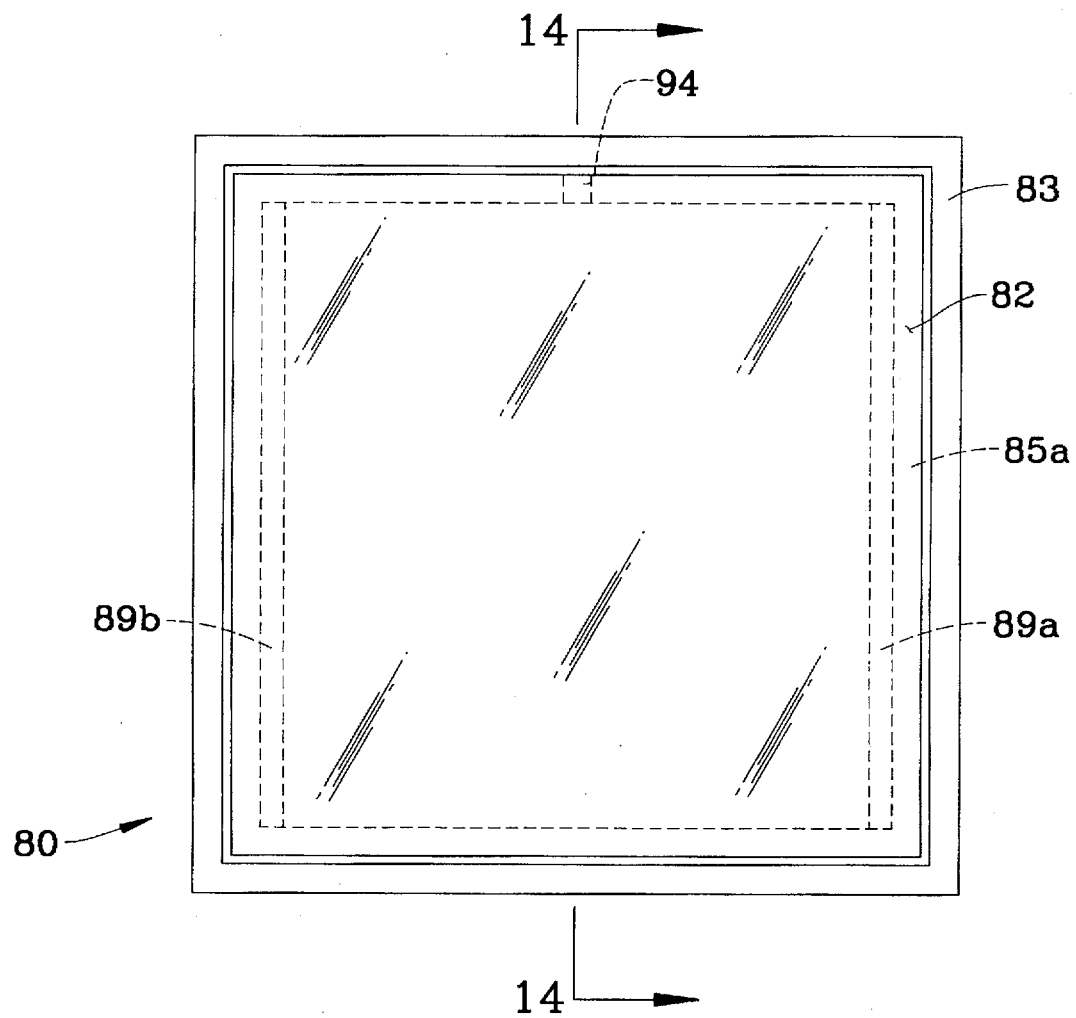
FIG. 13 is a plane view of the transparent heating plate of an embodiment of this invention.
Figure 14:
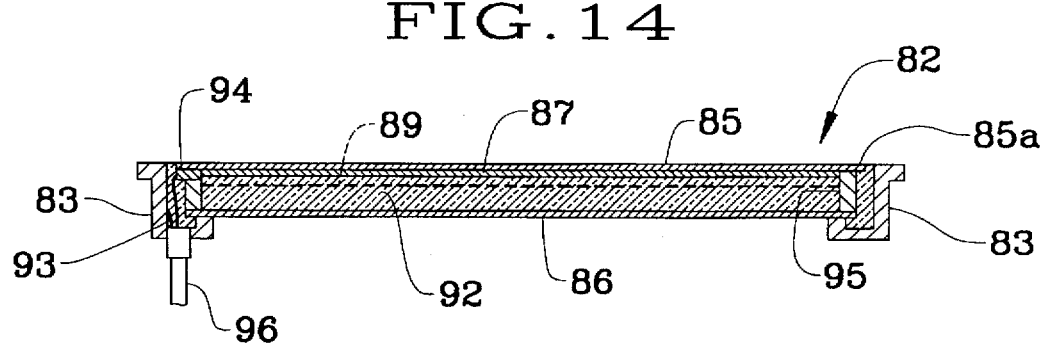
FIG. 14 is a cross-sectional view along the 14—14 line in FIG. 13.
Figure 15:
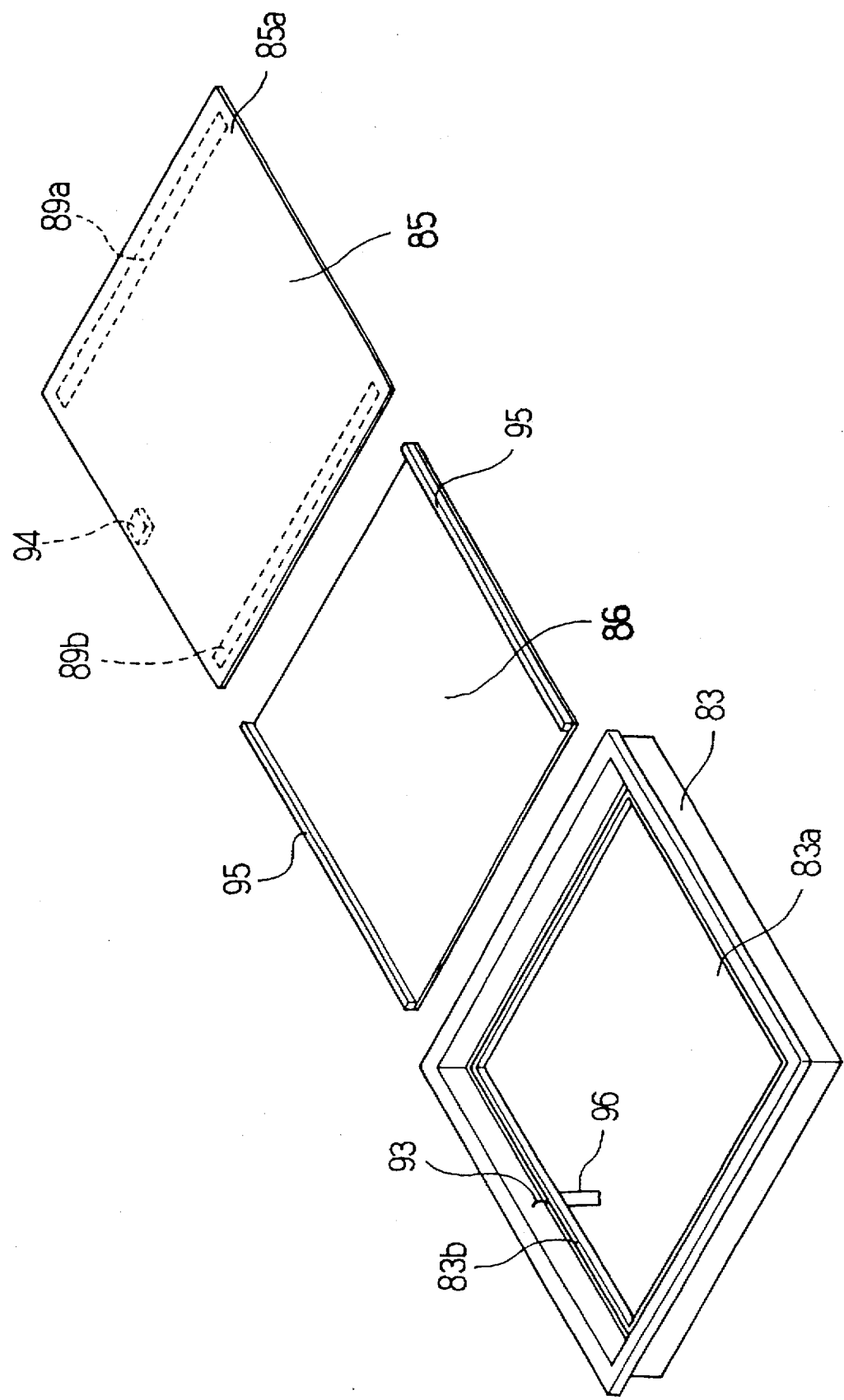
FIG. 15 is a perspective view which illustrates the structure of the assembled transparent heating plate of this invention.

Next, the transparent heating plate for microscope of another embodiment of this invention is described FIG. 13 is a plan view of the transparent heating plate for microscope 80 of an embodiment of this invention. FIG. 14 is a sectional view along the 14—14 line in FIG. 13. FIG. 15 is a perspective view of the structure of the assembled transparent heating plate.

The transparent heating plate for microscope 80 of this embodiment comprises a transparent plate assembly 82 and a ring-shaped housing 83 for holding the transparent plate assembly. The transparent plate assembly 82 comprises a first transparent plate 85, a second transparent plate 86 put opposite to the first transparent plate 85 with a space of predetermined distance, and a transparent insulative material 92 filled between the first and second transparent plates 85 and 86. The housing 83 holds the peripheral part of the transparent plate assembly 82. The first transparent plate 85 has a transparent heating element 87 formed on the bottom side thereof and a pair of electrodes for first heating element 89a and 89b connected to the transparent heating element 87 and disposed opposite to each other.

Specically, the transparent heating plate for microscope 80 comprises a housing 83, a transparent plate assembly 82 encased in the housing 83, and a temperature sensor 84, as shown in FIGS. 13 to 15.

The transparent plate assembly 82 comprises a first transparent plate 85 and a second transparent plate 86, spacers 95 put between the transparent plates 85 and 86, a transparent insulative filling material 92 filled between the first and second transparent plates 85 and 86, and a temperature sensor 94 put between the first and second transparent plates 85 and 86. The two transparent plates 85 and 86 are of about the same size and put opposite in superposition. They are held apart at about a uniform distance throughout the whole part by two spacers 95 disposed inward apart from the opposite sides of the transparent plate 85 and 86. A transparent heating element 87 is formed on the inner side bottom side) of the transparent plate 85. The transparent plate 85 has a region 85a without the transparent heating element in the peripheral part on the entire circumference. Electrodes 89a and 89b are also formed inward apart from the circumference of the transparent plate assembly, in other words, inward at a predetermined distance f in the circumference of the transparent plate 85. Since the transparent heating element and the electrodes are formed so that they are inward apart from the circumference of the transparent plate, in other words, a region without the heating element or the electrodes is formed in the peripheral part of the transparent plate on the entire circumference, electromagnetic waves generated from the trans, parent heating element and the electrodes are prevented from arriving at above the transparent plate 85. Therefore, if electromagnetic waves (noises) are generated by the electrodes and the transparent heating elements, the effect of the electromagnetic waves on the specimens mounted on the transparent heating plate is prevented. The distance between the sides of the transparent plate 85 and the sides of the transparent heating element 87 and the electrodes 89a and 89b is preferably within the range of about 0.5 to 10 mm and more preferably 1 to 5 mm.

For the transparent plates 85 and 86, transparent and insulative plates made of glass or a synthetic resin are used. Any synthetic resin plates may be used without particular limitations if sufficiently transparent and insulative. Synthetic resin plates with a high transparency such as acrylic plates, polycarbonate plates, and styrene plates are preferable. Those with a high hardness are further preferable. Glass plates are preferable because of its higher transparency and lower heat conductivity. The shape of the transparent plates is not limited to a square described above, and may be a circle. A circle here includes not only a true circle, but also an ellipse and an elongated circle. It is not limited to a square, and may also be a four-sided figure other than a square such as a rectangle, parallelogram or rhombus) or a polygon such as a hexagon.

The transparent heating element 87 is formed of a conductive thin metal film. For the conductive thin metal film, one with the property of generating heat when an electric current is flowed in it is used. Specifically, tin oxide, SiO2-indium alloy, indium oxide, tin- or antimony-doped indium oxide, and antimony-doped tin oxide are preferable. To form a conductive thin metal film on the inner sides of the transparent plates 85 and 86, vapor deposition (vacuum deposition, for example), spattering, dipping, or CVD can be used. For the electrodes 89a and 89b, a thin film of a metal with a high conductivity such as copper and silver is preferably used. The electrodes and the temperature sensor are electrically connected to the temperature controller when used.

For the transparent and inslative filling material, silicone and polyurethane can be used, and those with an adhesive property are particularly preferable. Silicone is preferable because of its insulating capability and stability. Silicone may be used in the state of silicone gel or silicone rubber. Of various types of silicone rubber, RTV silicone rubber and LTV silicone rubber with an adhesive property are preferable. Either one-liquid type or two-liquid type maybe used.

The housing 83 has a hole 83a formed at the central part, a transparent plate assembly mounting part 83b formed so as to surround the hole 83a, and a small hole for passing the wires connected to the electrodes and the temperature sensor and a grounding wire connected to the housing described later through, as shown in FIGS. 14 and 15. The housing 83, at least its surface, preferably has an electrical conductivity. For this purpose, the method that forms the whole body of the housing of an electrically conductive material, and the method that treats the surface of the housing 83 to impart a conductivity are usable. In the former method, it is attained by forming the housing of an electrically conductive metal or an electrically conductive synthetic resin, for example. In the latter method, it is attained by applying a conductive paint or vapor-depositing a conductive metal. It is preferable to connect a grounding wire 93 to a thus formed electrically conductive housing 83 as shown in FIGS. 13 to 15. By thus constructing, when electromagnetic waves generated by the electrodes or the transparent heating element or coming from the outside strike the housing, the electromagnetic waves flow on the grounding wire connected to the housing and disappear. Therefore, it can prevent electromagnetic waves from flowing into the object examined mounted on the transparent heating plate.

The temperature sensor 94 is disposed so as to be put in contact with the transparent plate assembly. Specifically, the temperature sensor 94 is positioned between the two transaparent heating plates 85 and 86 in contact with the bottom side of the first transparent plate 85. Being thus disposed, the temperature sensor 94 is located inside the transparent plate assembly. The temperature sensor 94 may be disposed on the top side or the bottom side of the transparent plate assembly 82. For the temperature sensor 94, any device with which the temperature can be detected may be used without particular limitations. A thermocouple, and a thermistor are preferable. The wires connected to the electrodes and the temperature sensor and the grounding wire are bound into a cord 96 and extended to the outside through the small hole in the housing 93. The code 96 is fitted with a connector (not shown) at the end This connector forms the connection terminal connected to the temperature controller described later.

This transparent heating plate 80 is used being attached to the stage of a microscope. When forming the transaparent plate assembly in the shape of a circle, it is preferable to form a transparent heating element and electrodes on both the first and second transparent plates so that they are inward apart from the circumference of the transparent plate, in other words, a region where neither a transparent heating element nor an electrode is formed is left in the peripheral part of the transparent plate on the entire circumference, and so that the electrodes on the first transparent plate and those on the second transparent plate substantially do not overlap, and the center line of the electrodes on the first transparent plate and that of the electrodes on the second transparent plate intersect each other substantially at right angles at the center of the plate, as in the transparent plate assembly of the embodiment shown in FIGS. 1 to 6 and described above. Specifically, two electrodes are formed so as to be disposed opposed to each other in area of the length of one quarter inside the entire circumference and fitted to the circular shape of the first transparent plate. Similarly, two electrodes formed on the second transparent plate so as to be disposed opposed to each other in arcs of the length of one quarter inside the entire circumference and fitted to the circular shape of the second transparent plate. It is preferable to dispose so that their center lines intersect at right angles. By thus forming electrodes, the transparent plate assembly is enclosed by the four electrodes on almost the entire circumference.

The temperature control device for microscope stage (transparent heating device for microscope) of this invention comprises the transparent heating plate for microscope 80 and a temperature controller. For the temperature controller, the temperature controller 31 of the structure as shown in FIG. 7 is preferably used. In the temperature control device for microscope stage of this embodiment, it is desired that the effect of electromagnetic waves can be substantially completely prevented. Therefore, it is preferable that the temperature control function (power supply control function, in other words) of the temperature controlling part 35 is performed by a function which changes the voltage applied or a function which changes the load current. Generation of electromagnetic waves is reduced in comparison to when performing the temperature control by switching on and off the power supply. In that construction, the temperature controlling part raises the voltage or current when the measured temperature is lower than the set temperature input from the set temperature inputting part, lowers the voltage or current when the measured temperature is higher than the set temperature input from the set temperature, and maintains the applied voltage or current when the measured temperature is equal to the set. The rest is the same as described above and shown in FIG. 7.

Figure 16:
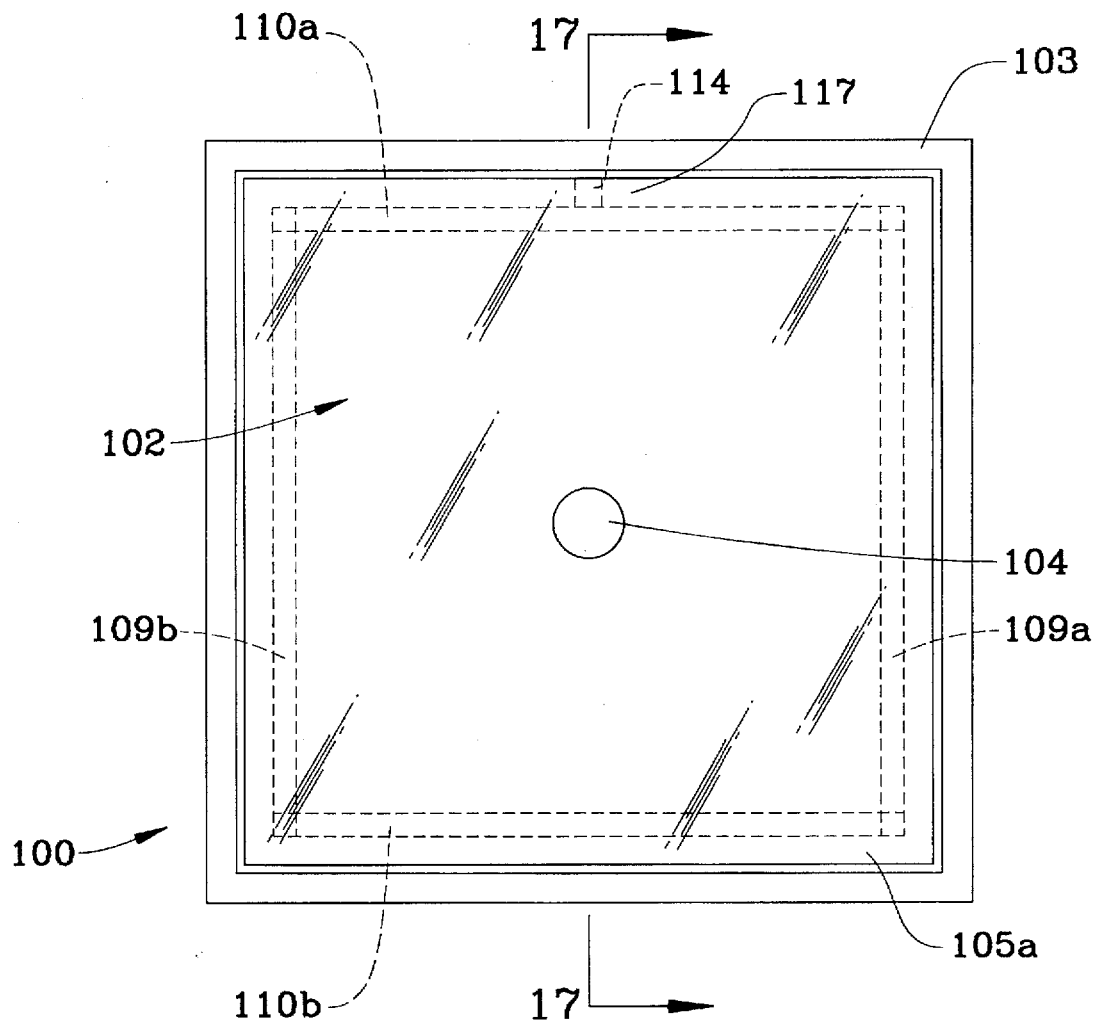
FIG. 16 is a plan view of the transparent heating plate of an embodiment of this invention.
Figure 17:
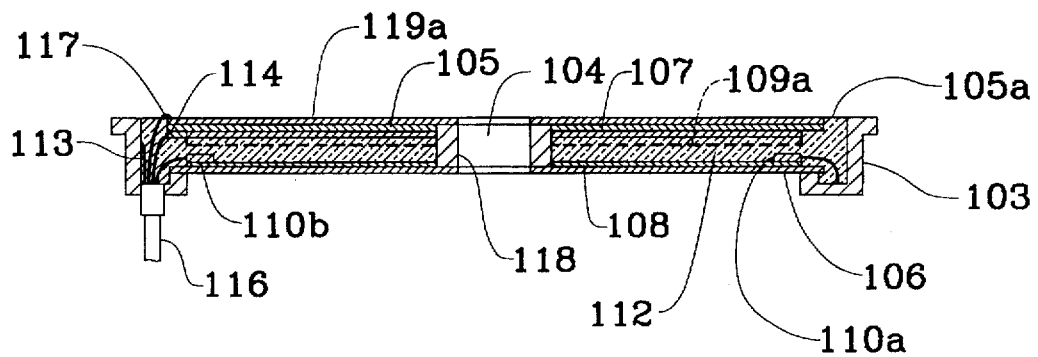
FIG. 17 is a cross-sectional view along the 17—17 line in FIG. 16.
Figure 18:
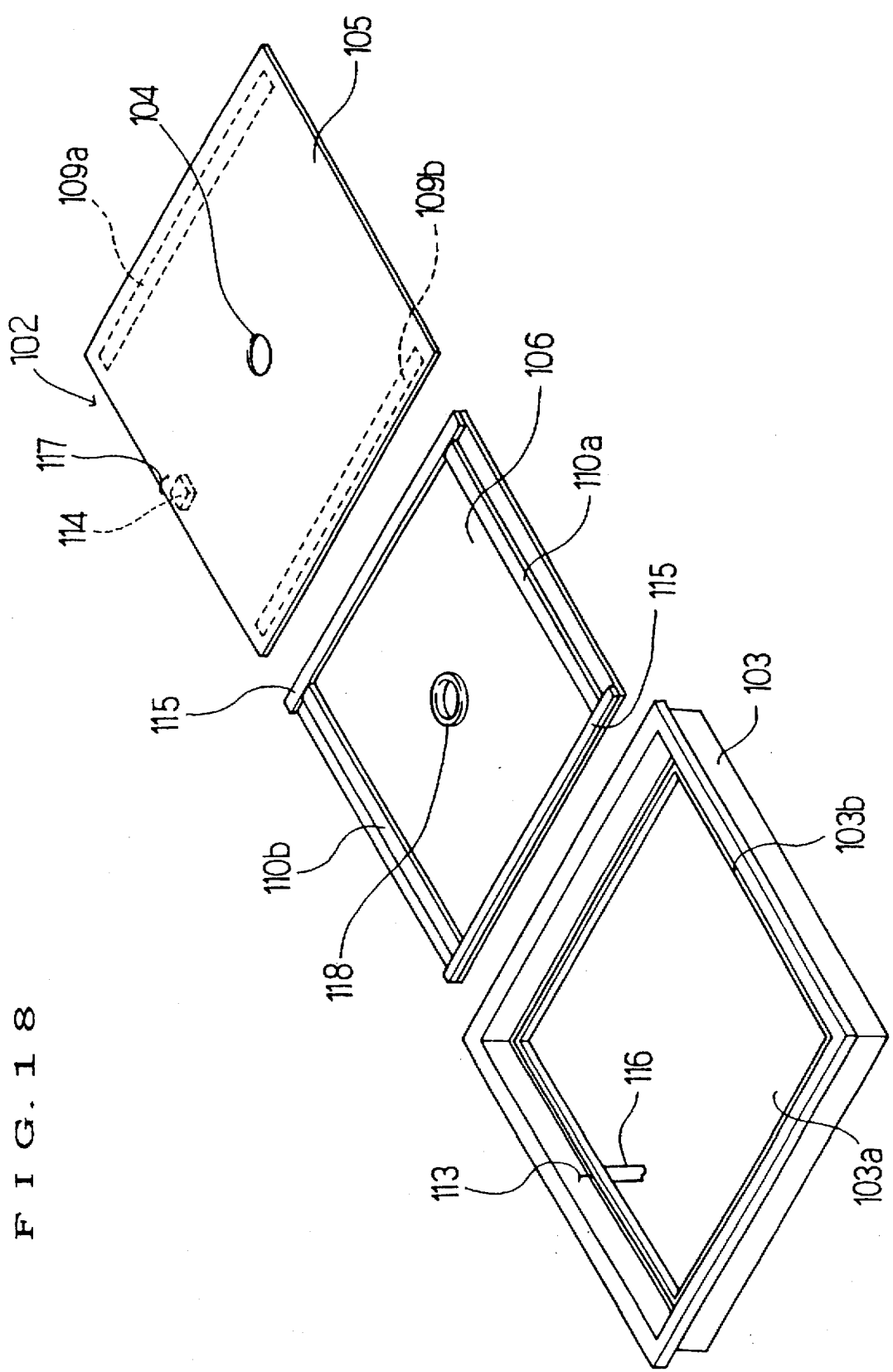
FIG. 18 is a perspective view which illustrates the structure of the assembled transparent heating plate of this invention.

Next, the transparent heating plate for microscope of another embodiment of this embodiment of this invention is described. FIG. 16 is a plan view of the transparent heating plate for microscope 100 of an embodiment of this invention. FIG. 17 is a sectional view along the 17—17 line in FIG. 16. FIG. 18 is a perspective view of the structure of the assembled transparent heating plate.

The transparent plate assembly for microscope 100 of this embodiment comprises a transparent plate assembly 102 which comprises a first transparent plate 105, a second transparent plate 106, a transparent heating element 107 formed on either one of the opposite aides of the two transparent plates, and transparent conductive film 119 formed on the outer side of the transparent plate 105, and a housing 103 which holds the peripheral part of the transparent plate assembly 102. This transparent plate assembly further has a pair of electrodes for heating element 109a and 109b formed on the transparent heating element 107, formed on either one of the opposite side of the two transparent plates 105 and 106, so that they are connected to the transparent heating element 107 and opposite to each other, and a region without the transparent heating element formed in the peripheral part on the entire circumference of the bottom side, the electrodes 109a and 109b being formed apart from the circumference of said transparent plate assembly. This transparent plate assembly further has a grounding wire 117 connected to the transparent conductive film 119 formed on the top side of the transparent plate 105.

The transparent heating plate for microscope 100 comprises a transparent plate assembly 102 and a rectangular housing 103 which holds the peripheral part of the transparent plate assembly 102. The transparent plate assembly 102 comprises a first transparent plate 105, a second transparent plate 106 put opposite to the first transparent plate 105 in superposition with a space of predetermined distance, and a transparent insulative filling material 112 filled between the first and second transparent plates 105 and 106. The transparent plate assembly 102 has a through hole 104 formed at the center. The housing 103 holds the peripheral part of the transaparent plate assembly 102. The through hole 104 in the transparent plate assembly 102 is used to check the lens of an inverted microscope from above. The first transparent plate 105 has a first transparent heating element 107 formed on the inner side, a pair of electrodes for first heating element 109a and 109b connected to the first transparent heating element 107 and disposed opposite to each other, and a hole formed at the center. The first transparent plate 105 has a region where neither the transparent heating element nor the electrodes is formed, in the peripheral part. That is, the sides of the transparent heating element 107 and those of the electrodes 109a and 109b are a predetermined distance apart from the circumference (sides) of the transparent plate 105. In other words,the transport heating element and the electrodes 109a and 109b are formed so that their sides are a little inward from the circumference of the transparent plate 105. Being thus formed, electromagnetic waves generated by the transparent heating element and the electrodes are prevented from reaching above the transparent plate assembly. Therefore, if electromagnetic waves are generated by the transparent heating element and the electrodes, the effect of the electromagnetic waves on the object examined mounted on the transparent plate is prevented. The second transparent plate 106 has a second transparent heating element 108 and a pair of electrodes for second heating element 110a and 110b connected to the second transparent heating element 108 and disposed opposite to each other, formed on the inner side (the side opposite to the transparent plate 105). The transparent plate 108 has a hole at the center. Similarly to the first transparent plate 105, the second transparent plate 106 has a region without the transaparent heating element nor the electrode in the peripheral part. The sides of the transparent heating element 108 and those of the electrodes 110a and 110b are a predetermined distance apart from the circumference (sides) of the transparent plate 106. In other ward, the transparent heating element 108 and the electrodes 110a and 110b are formed a little inward from the circumference of the of the transparent plate 106. Being thus formed, electromagnetic waves generated by the electrodes and the transparent heating element are prevented from reaching above the transparent plate assembly.

The distance between the sides of the transparent plate and those of the transparent heating element and the electrodes is preferably within the range of about 0.5 to 10 mm and more preferably 1 to 5 min.

The center line of the opposite electrodes for second heating element 110a and 110b are oriented so as to intersect that of the opposite electrodes for first heating element 109a and 109b substantially at right angles at the center of the transparent plate assembly. Being constructed so that the center lines of both electrodes intersect substantially at right angles, at least the central part of the transparent heating plate has a good heating state.

The first transparent plate 105 has a transparent conductive film 119 formed on the top side, and a grounding wire 117 connected to this transparent conductive film. Therefore, if electromagnetic waves generated by the electrodes and the transparent heating element or coming from outside reach the outer side of the transparent plate, they flow into the grounding wire from the conductive film 119, and are prevented from affecting the object examined mounted on the transparent heating plate. Spacers 115 and a temperature sensor 114 are disposed between the first transparent plate 105 and the second transparent plate 106. A transparent insulative filling material 112 is filled between the two transparent plates. The transparent heating elements 107 and 108 are prevented from short circuiting by these transparent insulative filling material 112 and the spacers 115. For the temperature sensor 114, any device with which the temperature can be detected may be used without particular limitations. A thermocouple and a thermistor are preferable.

In this embodiment, the first transparent plate 105 and the second transparent plate 106 are substantially of a square, and have a hole at the center. They have the transparent heating elements 107 and 108 formed on almost the entire surface. The first transparent plate 105 has two electrodes 109a and 109b, extending along almost the entire length of opposite sides and fitted to the square shape. As a result, the transparent plate 105 has regions without an electrode, formed on the other opposite sides. Similarly, the second transparent plate 106 has two electrodes 110a and 110b, extending along almost the entire length of opposite sides and fitted to the square shape. Therefore, the transparent plate 106 also has regions without an electrode, formed on the other opposite sides.

As described in FIGS. 16 and 17, the transparent plates 105 and 106 are put in superposition so that the electrodes 109a and 109b of the first transparent plate 105 and the electrodes 110a and 110b of the second transparent plate 106 do not overlap except their end portions. As a result, the center line of the electrode 109a and 109b intersects that of the electrodes 110a and 110b substantially at right angles. Further, the electrodes of each transparent plate are prevented from coming into contact with the transparent heating element on the other transparent plate by spacers 115 put between the transparent plates 105 and 106. By thus disposing the electrodes, the transparent plate assembly 102 is enclosed by the four electrodes on almost the entire circumference, as shown in FIG. 18. In addition, a ring-shaped spacer 118 with an inside diameter almost equal to the diameter of the hole is put between the transparent plates 105 and 106 at the center. This spacer 118 is directly in contact with the transparent plates 105 and 106. Specifically, a region where a transparent, heating element is not formed is formed around the part at which the spacer 118 is placed, in other words, around the hole. The spacer is put at these regions. Therefore, the transparent heating elements are not exposed. By this construction, generation of electromagnetic waves toward above the transparent heating plate from around the hole can be prevented.

For the material from the transparent plates 105 and 106, the materials described above are preferably use& The shape of the transparent plates is not limited to the square described above, and may be a four-sided figure such as a rectangle, and further a polygon such as a hexagon. It may farther be a circle. A circle here includes not only a true circle, but also an ellipse and an elongated circle. On the shape of the electrodes, all the electrodes 109a, 109b, 110a, and 110b formed are preferably of the same size, but may be different. For example, the electrodes 109a and 109b formed on the first transparent plate 105 may be formed shorter than the whole length of the corresponding sides (about two thirds of the length of the sides centered on the sides, for example). The electrodes 110a and 110b on the second transparent plate 106 too may be formed shorter than the whole length of the corresponding sides (about two thirds of the length of the sides centered on the sides, for example). Further, the length of the electrodes 109a and 109b and that of the electrodes 110a and 110b may be different. When thus forming the electrodes, regions which are not heated are made in the transparent plate assembly. However, by disposing the electrodes so that the center lines of both electrodes intersect substantially at right angles, a good heating state is obtained at the central part of the transparent plate assembly.

The transparent heating elements 107 and 108 and the transparent conductive film 119 are formed of a conductive thin metal film. For the material of the thin metal film, those described above are preferably used. For the electrodes 109a, 109b, 110a, and 110b, a film of a metal with a high conductivity such as copper and silver is preferably used. The electrodes and the temperature sensor are eclectically connected to the temperature controller when used. For the insulative and transparent filling material, those described above are preferable.

The housing 103 has a hole 103a formed at the center, a transparent plate assembly mounting part 103b formed so as to surround the hole 103a, and a small hole for passing the wire temperature sensor electrodes and the temperature sensor and a grounding wire connected to the housing described later through, as shown in FIG. 18. Further, the housing 103, at least its surface, preferably has an electrical conductivity. It is preferable to connect a grounding wire 113 to this conductive housing 103, as shown in FIGS. 16 to 18.

The wires connected to the electrodes and the temperature sensor and the grounding wires 113 and 117 are bound into a cord 116 and extended to the outside through the small hole in the housing 103. The code 116 is fitted with a connector (not shown) at the end. This connector forms the connection terminal connected to the temperature controller described later. The temperature control device for microscope stage (transparent heating device for microscope) of this invention comprises the transparent heating plate for microscope 100 and a temperature controller.

For the temperature controller, the temperature controller 31 of the structure as shown 7 described above is preferably used. In the temperature control device for microscope stage of this embodiment, it is desired that the effect of electromagnetic waves can be substantially completely prevented. Therefore, it is preferable that the temperature control function (power supply control function, in other words) of the temperature controlling part 35 is performed by a function which changes the voltage applied or a function which changes the load current. Generation of electromagnetic waves is reduced in comparison to when performing the temperature control by switching on and off the power supply.

Figure 19:
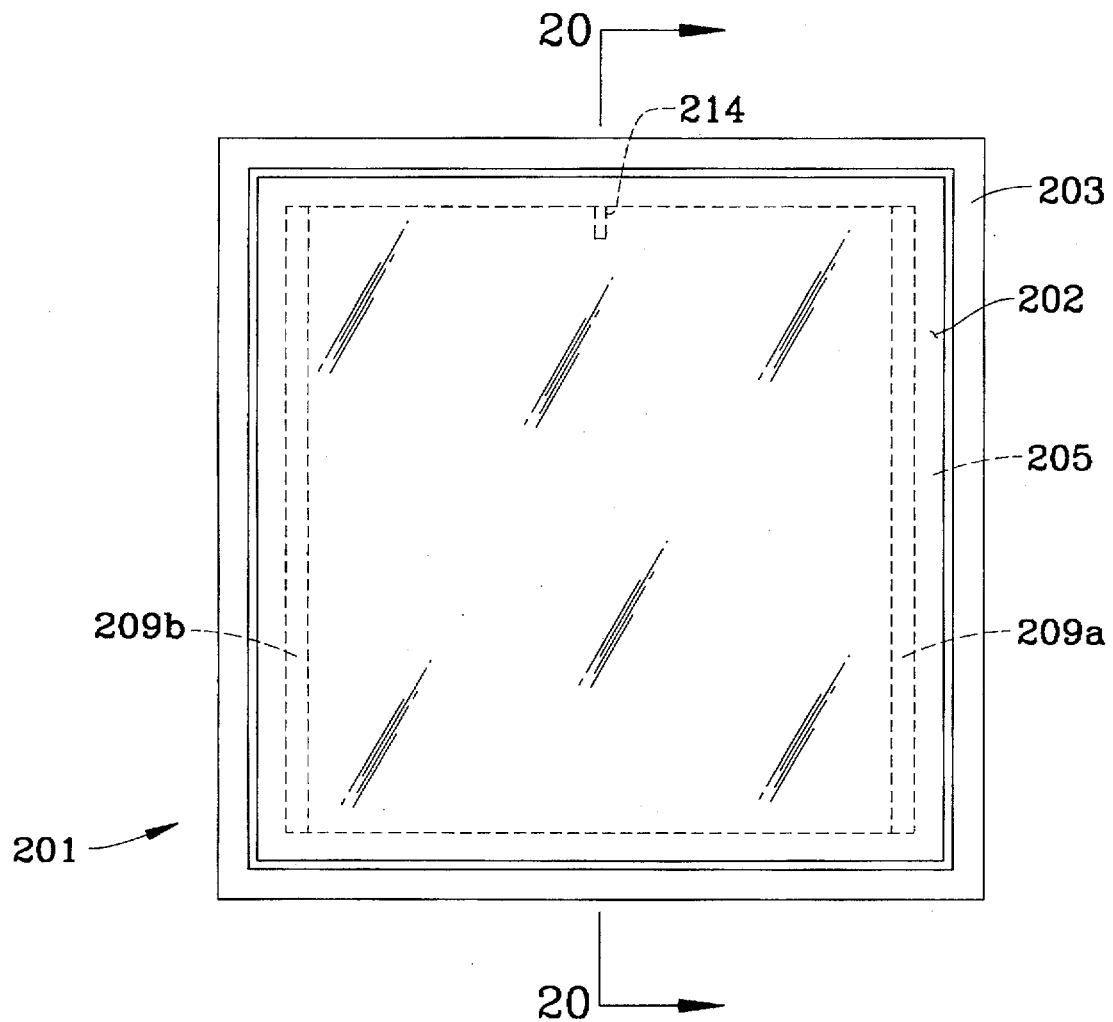
FIG. 19 is a plan view of the transparent heating plate of another embodiment of this invention.
Figure 20:
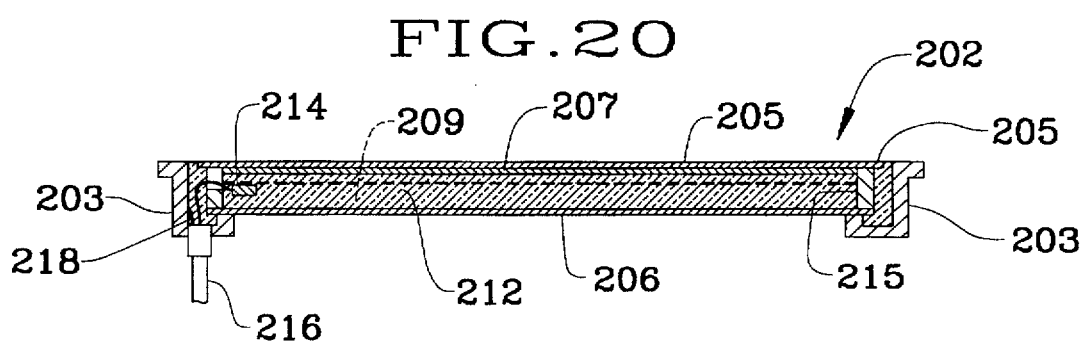
FIG. 20 is a cross-sectional view along the 20—20 line of in FIG. 19.
Figure 21:
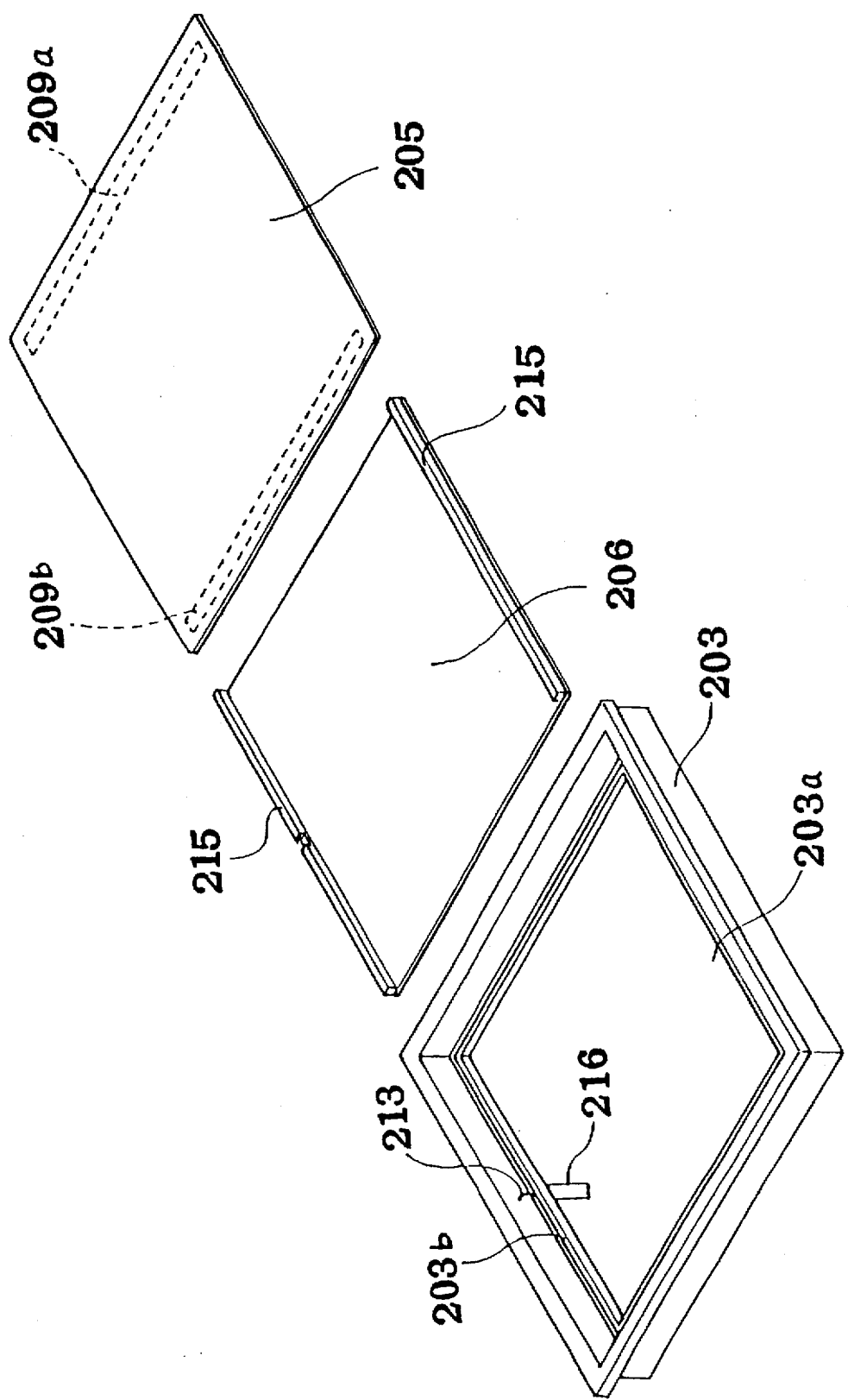
FIG. 21 is a perspective view which illustrates the parts used for the transparent heating plate of this invention.

Next, the transparent heating plate of another embodiment of this invention is described. FIG. 19 is a plan view of the transparent heating plate for microscope 201 of an embodiment of this invention. FIG. 20 is a sectional view along the 20—20 line in FIG. 19. FIG. 21 is a perspective view illustrating the parts used for the transparent heating plate of this embodiment.

The transparent heating plate 201. comprises a transparent plate assembly 202 and the housing 203 which holds the transparent plate assembly 202.

The transparent plate assembly 202 comprises a first glass plate 205, a second glass plate 206 put opposite to the first glass plate 205 with a space of predetermined distance, and a transparent insulative material 212 filled between the first and second glass plates 205 and 206. The housing 203 holds the peripheral part of the transparent plate assembly 202. The first glass plate 205 has a transparent conductive film (transparent heating element) 207 formed on either side and a pair of electrodes for heating conductive film 209a and 209b connected to the transparent conductive film 207 and disposed opposite to each other.

Specifically, the transparent heating plate for microscope 201 comprises a housing 203, a transparent plate assembly 202 encased in the housing 203, and a temperature sensor 214, as shown in FIGS. 19 to 21. The transparent plate assembly 202 comprises a first glass plate 205, a second glass plate 206, spacers 215 put between the glass plates 205 and 206, a transparent insulative material (transparent insulative filling material) 212 filled between the first and second glass plates 205 and 206, and a temperature sensor 214 disposed between the first and second glass plates 205 and 206. The first glass plate 205 to form the top side is made a litter larger than the second glass plate 206 to form the bottom side. However, they may be of the same size. They are put opposite to each other in superposition. They are held apart about a uniform distance throughout the whole part by two spacers 215 disposed inside the circumference of the glass plates 205 and 206. A transparent conductive film 207 is formed on the inner side of the glass plate 205 (the side opposite to the glass plate 206). The transparent conductive film may be formed on the top side of the glass plate 206 the side opposite to the glass plate 205), instead of the glass plate 205.

In this embodiment, the first glass plate 205 and the second glass plate 206 are substantilly of a square. The transparent conductive film 207 is formed on almost the entire surface of the bottom side of the first glass plate 205. The first glass plate 205 has two electrodes 209a and 209b, extending along almost the entire length of opposite sides and fitted to the square shape. These electrodes 209a and 209b are connected to the transparent conductive film 207. As the restfit, the other opposite sides of the glass plate 205 are regions where no electrode is formed. The temperature sensor 214 is disposed at about the middle position of the regions without an electrode.

For the glass plates 205 and 206, glass with a high transparency is preferable. The shape of the glass plates is not limited to the square described above, and may be a four-sided figure such as a rectangle, a polygon such as a hexagon, and further a circle (true circle and ellipse).

The transparent conductive film 207 has a certain resistance, though conductive. On the rate of heat generation, a conductive film that can heat the glass plate at above 20° C., preferably above 30° C., is preferable. Specifically, the transparent conductive film is formed of a conductive thin metal film. For the conductive thin metal film one with the property of generating heat when an electric current is flowed in it is used. Specifically, tin oxide, SiO2-indium alloy, radium oxide, tin- or antimony-doped indium oxide, and antimony-doped tin oxide are preferable. To form a conductive thin metal film on the inner sides of the glass plates 205 and 206, vapor deposition (vacuum deposition, for example), spattering, dipping, or CVD can be used. For the electrodes 209a and 209b, a thin film of a metal with a high conductivity such as copper and silver is preferably used. The electrodes and the temperature sensor are connected to the temperature controller when used.

For the transparent and insulative filling material 212, materials with an insulating capability, transparency, and adhesive property to glass plates and synthetic resin plates later described are used. Materials with an adhesive property to the temperature sensor are further preferable. For this transparent material, silicone resin, polyurethane resin, and epoxy resin can be used. Silicone resin is more preferable because of its insulating capability and stability. Silicone resin includes silicone gel and silicone rubber. Of silicone rubber, RTV silicone rubber and LTV silicone rubber with an adhesive property are preferable. Either one-liquid type or two-liquid type may be used. Specifically, product name KE109 (two-liquid type RTV silicone rubber, Shin'etu Chemical) is preferable.

The temperature sensor 214 is surrounded by the transparent material 212 so that it is held between the glass plates 205 and 206 without contact with the transparent conductive film 207 and its position does not easily move. That is, the temperature sensor 214 is secured by the transparent material 212. For the temperature sensor 214, any device with which the temperature can be detected may be used without particular limitations. A thermocouple and a thermistor are preferable.

The housing 203 has a hole 203a formed at the center, a transparent plate assembly mounting part 203b formed so as to surround the hole 203a, and a small hole for passing the wires connected to the electrodes and the temperature sensor and a grounding wire connected to the housing described later through, as shown in FIGS. 20 and 21. Further, the housing 203, at least its surface, preferably has an electrical conductivity. For this purpose, the method that forms the whole body of the housing 3 of an electrically conductive material, and the method that treats the surface of the housing 203 to impart a conductivity are usable. In the former method, it is attained by forming the housing of an electrically conductive metal or an electrically conductive synthetic resin, for example. In the latter method, it is attained by applying a conductive paint or vapor-depositing a conductive metal. It is preferable to connect a grounding wire 218 to a thus electrically conductive housing 203 as shown in FIG. 20. By this construction, when electromagnetic waves generated by the electrodes or the transparent heating element or coming from the outside strike the housing, the electromagnetic waves flow on the grounding wire connected to the housing and disappear. Therefore, it cab prevent electromagnetic waves from flowing into the object examined mounted on the transparent plate.

The wires connected to the electrodes and the temperature sensor and the grounding wire are bound into a cord 216 and extended outside through the small hole in the housing 203. The code 26 is fitted with a connector (not shown) at the end. This connector forms the connection terminal connected to the temperature controller described later. The transparent heating plate for microscope 201 is used being attached to the stage of a microscope.

Figure 22:
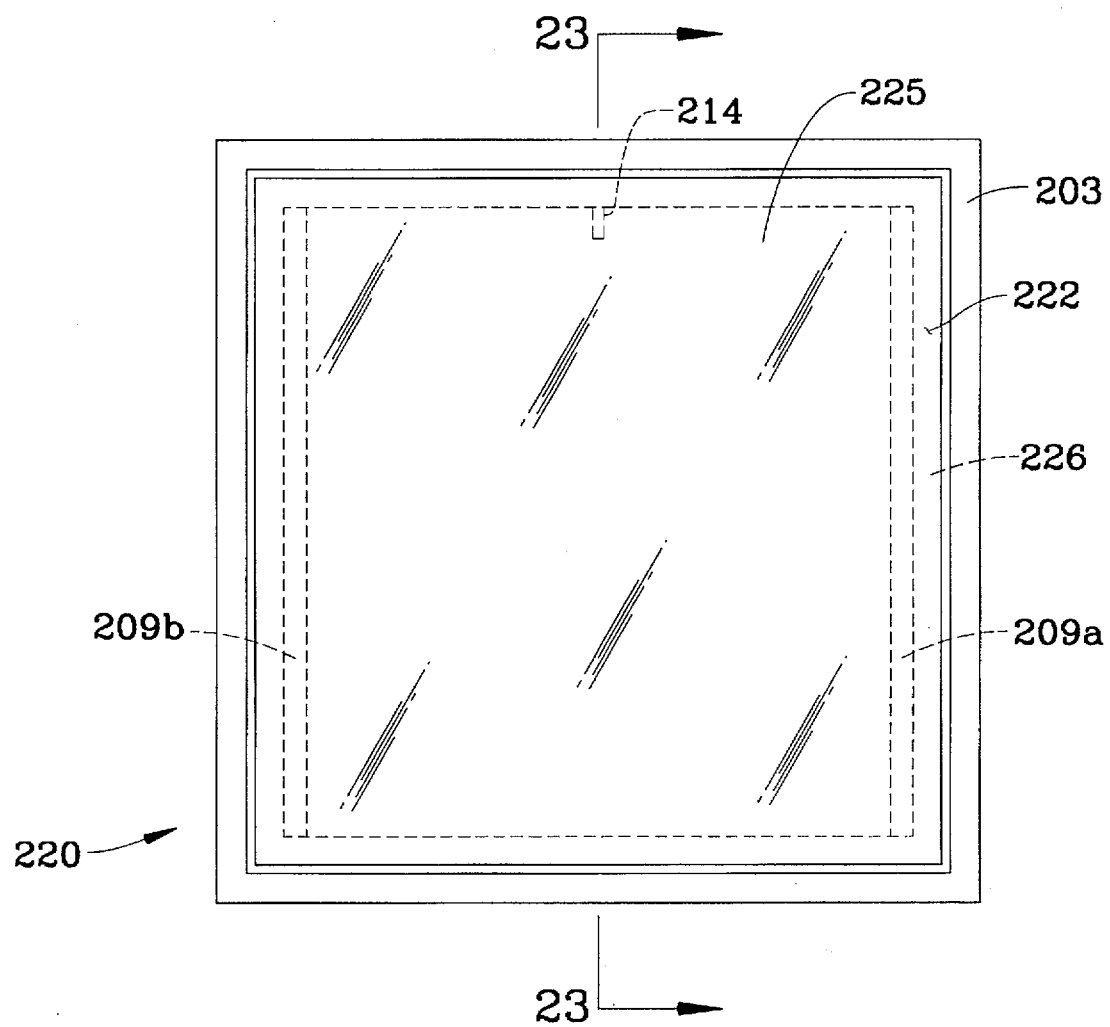
FIG. 22 is a plan view of the transparent heating plate of another embodiment of this invention.
Figure 23:
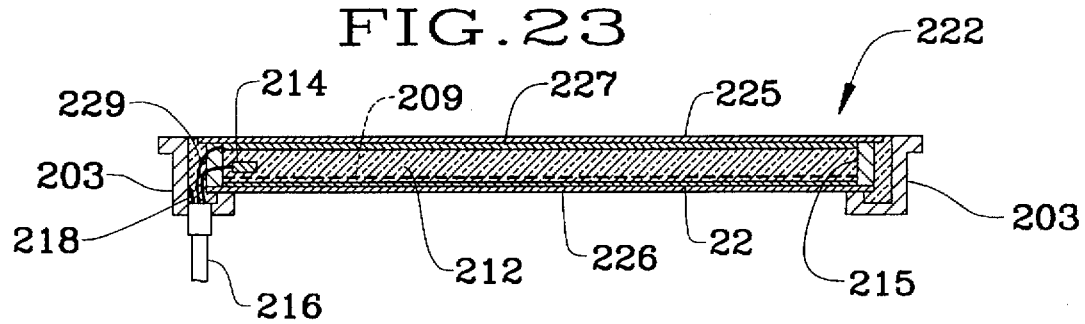
FIG. 23 is a cross-sections view along the 23—23 line in FIG. 22.
Figure 24:
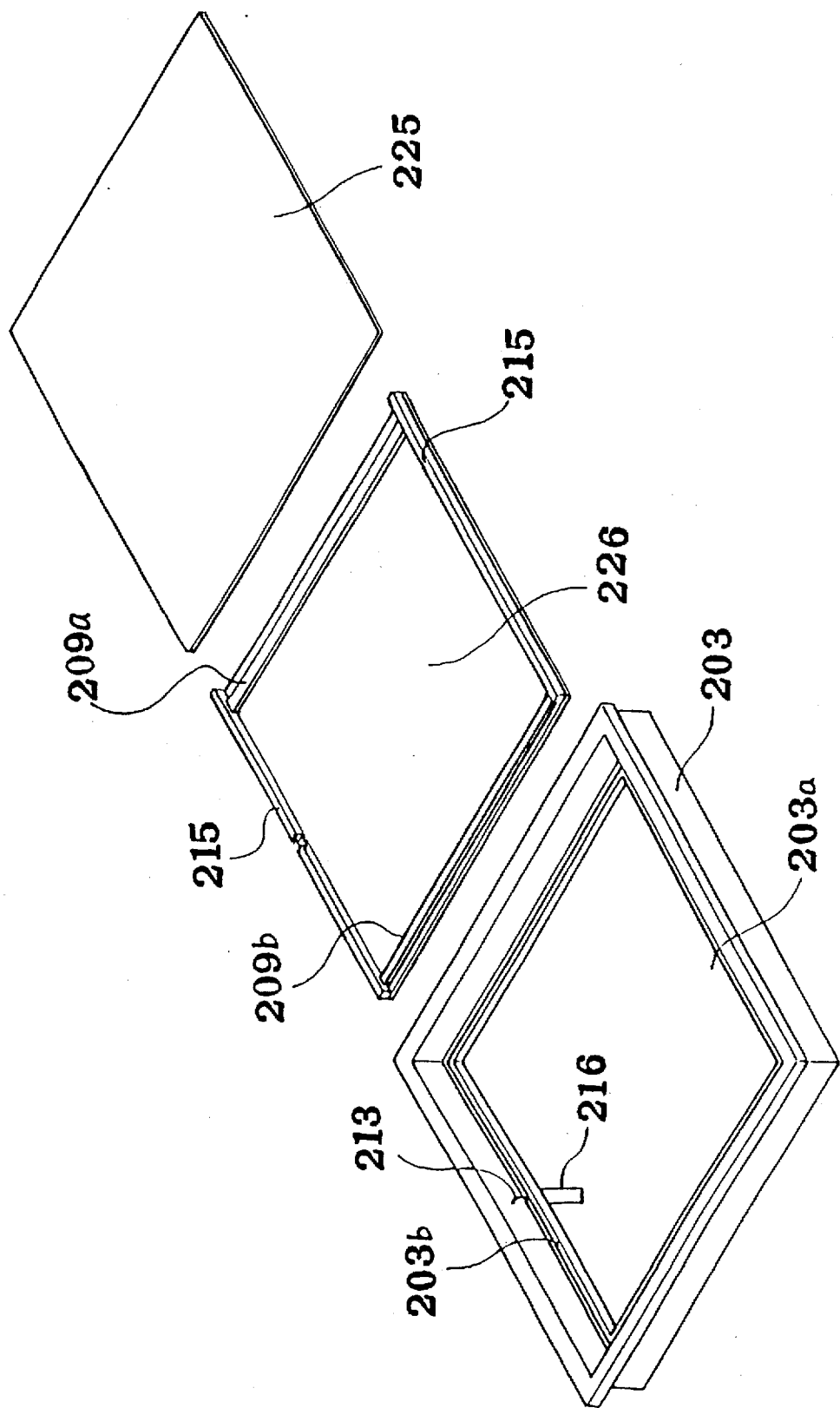
FIG. 24 is a perspective view which illustrates the parts used for the transparent heating plate of this invention.

Next, the transparent heating plate for microscope 220 of another embodiment of this invention is described. FIG. 22 is a plan view of the transparent heating plate for microscope 220 of this embodiment of this invention. FIG. 23 is a sectional view along the 23—23 line in FIG. 22. FIG. 24 is a perspective view which illustrates the parts used for the transparent heating plate of this invention.

The transparent heating plate for microscope 220 comprises a housing 203, a transparent plate assembly 222 encased in the housing 203, and a temperature sensor 214, as shown in FIGS. 2 to 24. The transparent plate assembly 222 comprises a first transparent plate (glass plate) 225 and a second transparent plate (glass plate) 226, spacers 215 put between the glass plates 225 and 226, a transparent insulative filling material 212 filled between the glass plates 225 and 226, and a temperature sensor 214 disposed between the glass plates 225 and 226.

In this embodiment the first glass plate 225 and the second glass plate 226 are substantially of a square, and have the transparent conductive films 227 and 228 formed on almost the entire surface of their opposite sides. A grounding wire 229 is connected to the transparent conductive film 227 formed on the first glass plate 225. By this, electromagnetic waves striking the transparent conductive film 227 flow into the grounding wire and disappear. The glass plates 225 and 226 are held apart a uniform distance throughout the whole part by spacers 215 disposed at the opposite circumferences of the glass plates 215 and 216. The transparent conductive films 227 and 228 are prevented from short-circuiting by the transparent insulative filling material 212 and the spacers 215.

The second glass plate 226 has two electrodes 209a and 209b, extending along almost the entire length of the opposite sides, formed on the side with the transparent conductive film 228 formed, so as to fit to the square shape. As the result, the other opposite sides of the glass plate 226 are regions where no electrode is formed. The temperature sensor 214 is disposed at about the middle position of this regions without an electrode. Connection of the grounding wire and the electrodes may be interchanged. However, by thus disposing the glass plate with a transparent conductive film with a grounding wire connected at the top side, of electromagnetic waves are generated from the electrodes or the conductive film below and spread upward, they strike the conductive film above and hence are prevented from spreading outside, preferably. Further, since the lower glass plate 226 is formed smaller than the upper glass plate 225 in this embodiment, electromagnetic waves generated from the peripheral parts of the glass plate 226 (peripheral parts of the electrodes and the conductive film) more strike the peripheral parts of the glass plate 225, radiation of the generated electromagnetic waves to the outside is better prevented In this embodiment, the glass plate 226 has a region without a transparent conductive film the peripheral part on the entire circumference. The electrode 209a and 209b are formed at a position a little distance inward from the circumference of the transparent plate assembly, in other words, at a position a predetermined distance inward from the circumference of the glass plate 226. Since the sides of the electrodes and the transparent conductive film are inward apart from the circumference of the glass plate 226, in other words, regions without a transparent conductive film and an electrode are formed in the peripheral part of the glass plate on the entire circumference, electromagnetic waves generated from the electrodes and the transparent conductive film are prevented from being radiated out of the circumference of the glass plate 226. Therefore, electromagnetic waves (noises) generated from the electrodes and the transparent conductive film, if generated, more strike the peripheral parts of the first glass plate 225 above the glass plate 226, and hence radiation of the generated electromagnetic waves to the outside is better prevented. The distance between the sides of the glass plate 226 and those of the transparent conductive film 228 and the electrodes 209a and 209b is preferably within the range of about 0.5 to 10 mm, particularly preferably 1 to 5 mm.

For the glass plates, transparent conductive film, transparent insulative material and housing, the same ones as those of the embodiments described above are preferably used. Although glass plates are preferable for the transparent plates, synthetic resin plates may be used. Any synthetic resin plates may be used without particular limitations if they have a transparency and an insulating property. Synthetic resin plates with a high transparency such as acrylic plates, polycarbonate plates, and styrene plates are preferable. Synthetic resin plates with a high hardness are further preferable. Further, the transparent conductive films 227 and 228 must not be the same.

The wires connected to the electrodes and the temperature sensor, the grounding wire 229, and the grounding wire 218 connected to the housing are bound into a cord 216 and extended to the outside through the small hole 213 in the housing 203. The code 216 is fitted with a connector (not shown) at the end. This connector forms the connection terminal connected to the temperature controller described later.

Figure 27:
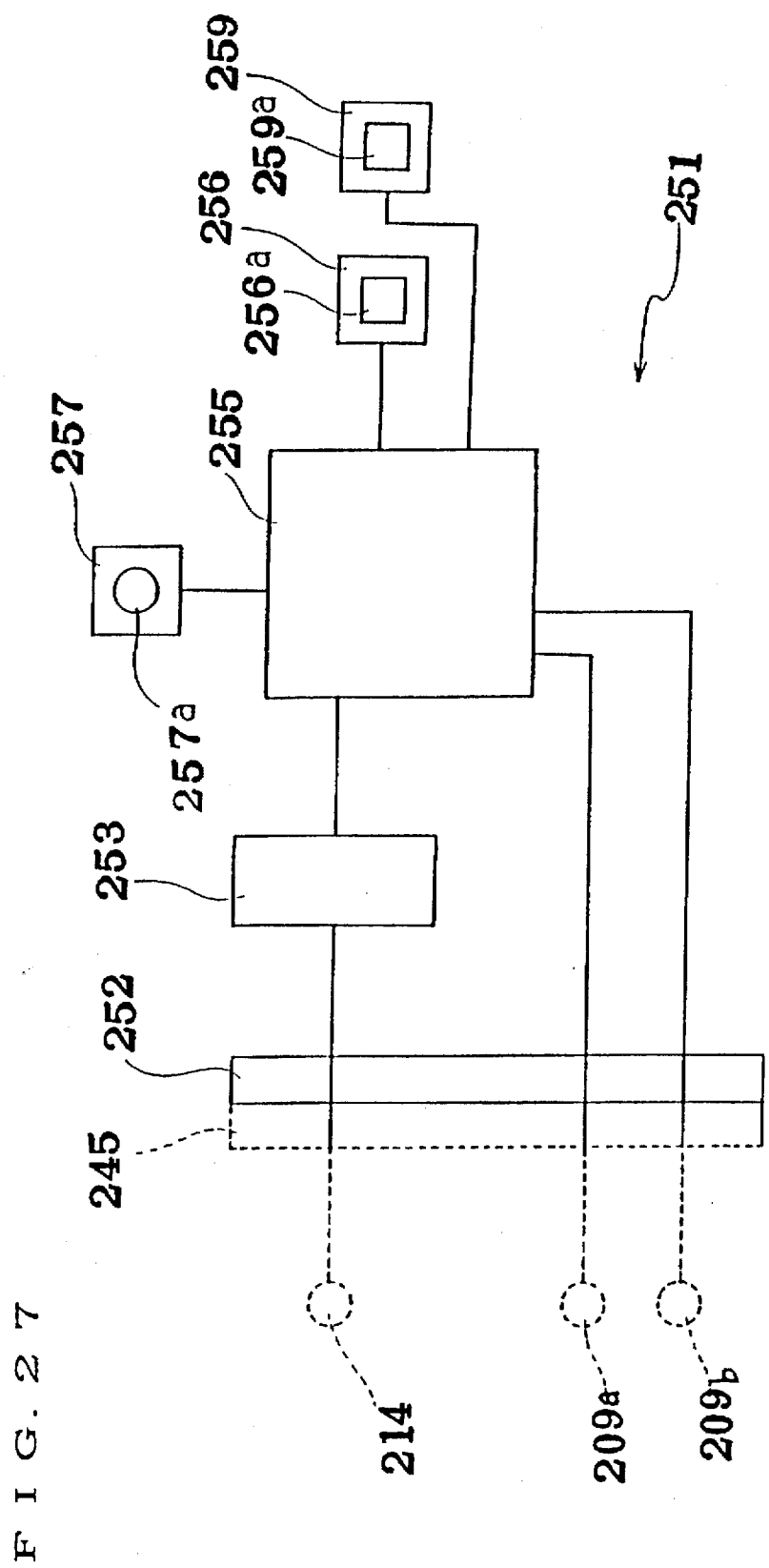
FIG. 27 is the block diagram of the temperature control unit used for the transparent heating device of this invention.

The temperature control device 250 of this invention comprises the transparent heating plate for microscope 220 described above and a temperature controller 251. The temperature controller 251, as shown in FIG. 27, comprises a connector 252 which can be connected to the connector 245 of the transparent heating plate (specimen mounting plate for microscope) 220, an A/D converter 253 for converting the analog signal detected by the temperature sensor 214 into digital signals, a temperature controlling part 255 to which the signals from the A/D converter 253 are input, a measured temperature displaying part 256 for displaying the temperature of the transparent plate assembly output from the temperature controlling part 255, an set temperature inputting part 257 for inputting a set temperature, a set temperature displaying part 259 for displaying the set temperatures input from the set temperature inputting part. The temperature controlling part 255 is electrically connected to the electrodes 209a and 209b connected to the transparent conductive film 228 via the connector 252 of the temperature controller 251 and the connector 245 of the transparent heating plate 220. It has a function for controlling the temperature of the transparent conductive film 28. The set temperature inputting part 257 is provided with an input switch 257a. The measured temperature displaying part 256 is provided with a display window 256a, and the set temperature displaying part 259 is also prodded with a display window 259a.

For the temperature control function (power supply control function, in other words) of the temperature controlling part 255, one in which performed with a function which adjusts the applied voltage or a function which adjusts a load current is used. Generation of electromagnetic waves can be reduced compared to when performing the temperature control by the ON/OFF state of the power supply.

The temperature controlling part is performed by controlling so as to raise the voltage or current when the detected, temperature is lower than the set temperature input from the set temperature inputting part, lowering the voltage or current when the detected temperature is higher than the set temperature input from the set temperature, and maintaining the voltage or current applied when the detected temperature is equal to the set temperature.

Figure 25:
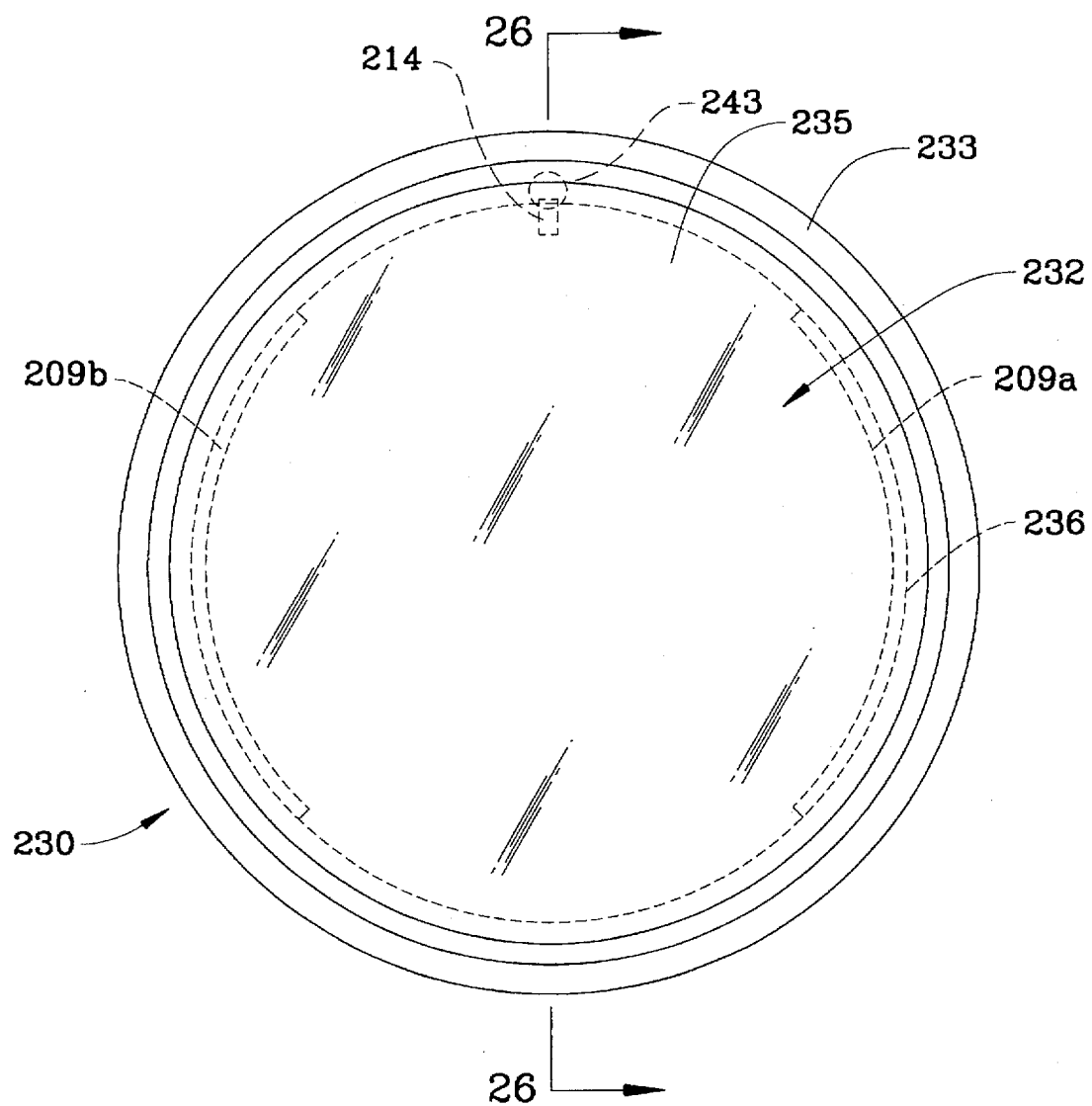
FIG. 25 is a plan view of the transparent heating plate of another embodiment of this invention.
Figure 26:
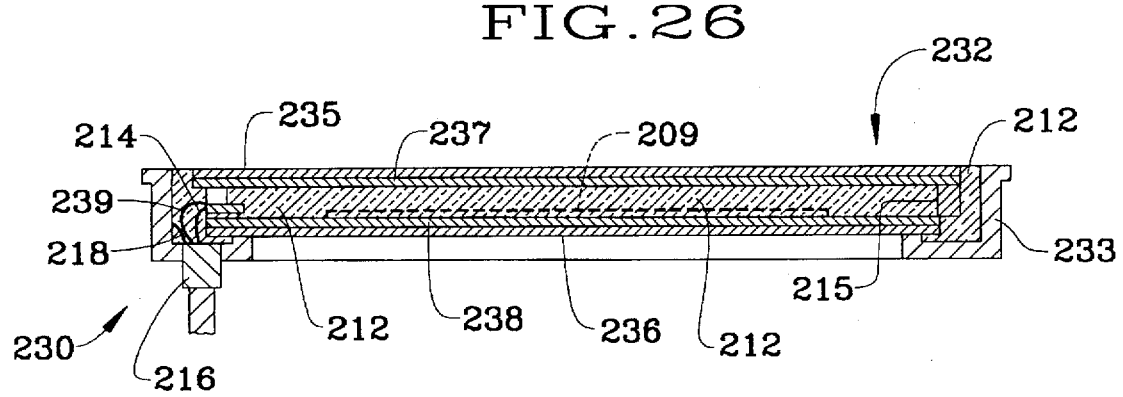
FIG. 26 is a cross-sectional view along the 26—26 line in FIG. 25.

Next, the transparent heating plate for microscope 230 of another embodiment of this invention is described. FIG. 25 is a plan view of the transparent heating plate for microscope 230 of another embodiment of this invention. FIG. 26 is a sectional view along G—G line in FIG. 25.

As shown in FIGS. 25 and 26, the transparent heating plate for microscope 230 comprises a housing 233, a transparent plate assembly 232 encased in the housing 233, and a temperature sensor 214. The transparent plate assembly 232 comprises a first transparent plate (glass plate) 235 and a second transparent plate (glass plate) 236, by a spacer 215 put between the glass plates 235 and 236, a transparent insulative filling material 212 filled between the glass plates 235 and 236, and a temperature sensor 214 put between the glass plates 235 and 236, as shown in FIG. 25.

In this embodiment, the first glass plate 235 and the second glass plate 236 are of a circle, and have the transparent conductive film 237 and 238 formed on almost the entire surface of their opposite sides. A grounding wire 239 is connected to the transparent conductive film 237 on the first glass plate 235. By this, electromagnetic waves striking the conductive film 237 flow into the grounding wire and disappear. The glass plates 235 and 236 are held apart a uniform distance by a spacer 215 disposed at the circumferences of the plates 235 and 236. The transparent conductive films 237 and 238 are prevented from shortcircuiting by the transparent insulative filling material 212 and the spacers 215.

On the second glass plate 236, two electrodes 209a and 209b opposite to each other in arcs of the length of about one quarter of the circumference are formed so as to fit to the circular shape. As e result, two regions without an electrode opposite to each other in arcs of the length of about one quarter of the circumference are formed on the glass plate 236. Connection of the grounding wire and the electrodes may be interchanged. However, by thus disposing the glass plate with a transparent conductive film with a grounding wire connected at the top side, if electromagnetic waves are generated from the electrodes or the conductive film below and spread upward, they strike the conductive film above and hence are prevented from spreading outside. Further, since the lower glass plate 236 is formed smaller than the upper glass plate 235 in this embodiment, electromagnetic waves generated from the peripheral parts of the glass plate 236 (peripheral parts of the electrodes and the conductive film) more strike the peripheral parts of the glass plate 235, of the generated electromagnetic waves to the outside is better prevented. The shape of the glass plates is not limited to the one described above. A circle here includes not only a true circle, but also an ellipse and an elongated circle. For the glass plates, transparent conductive film, transparent insulative material and housing, the same ones as those of the embodiments described above late preferably used. For the transparent plates, glass plates are preferable, but synthetic resin plates may be used. Any synthetic resin plates may be used without particular limitations if they have a transparency and an insulating property. Synthetic resin plates with a high transparency such as acrylic plates, polycarbonate plates, and styrene plates are preferable. Those with a high hardness are further preferable.

The wires connected to the electrodes and the temperature sensor, the grounding wire 239, and the grounding wire 218 connected to the housing are bound into a cord 216 and extended outside through the small hole 243 in the housing 233. The code 216 is fitted with a connector (not shown) at the end. This connector forms the connection terminal connected to the temperature controller described later.

This transparent heating plate 230 is used being attached to the stage of a microscope. The temperature control device of this invention comprises a transparent heater plate for microscope and a temperature controller. For the temperature controller, the one of the structures as shown in FIG. 27 is preferably used.

Figure 28:
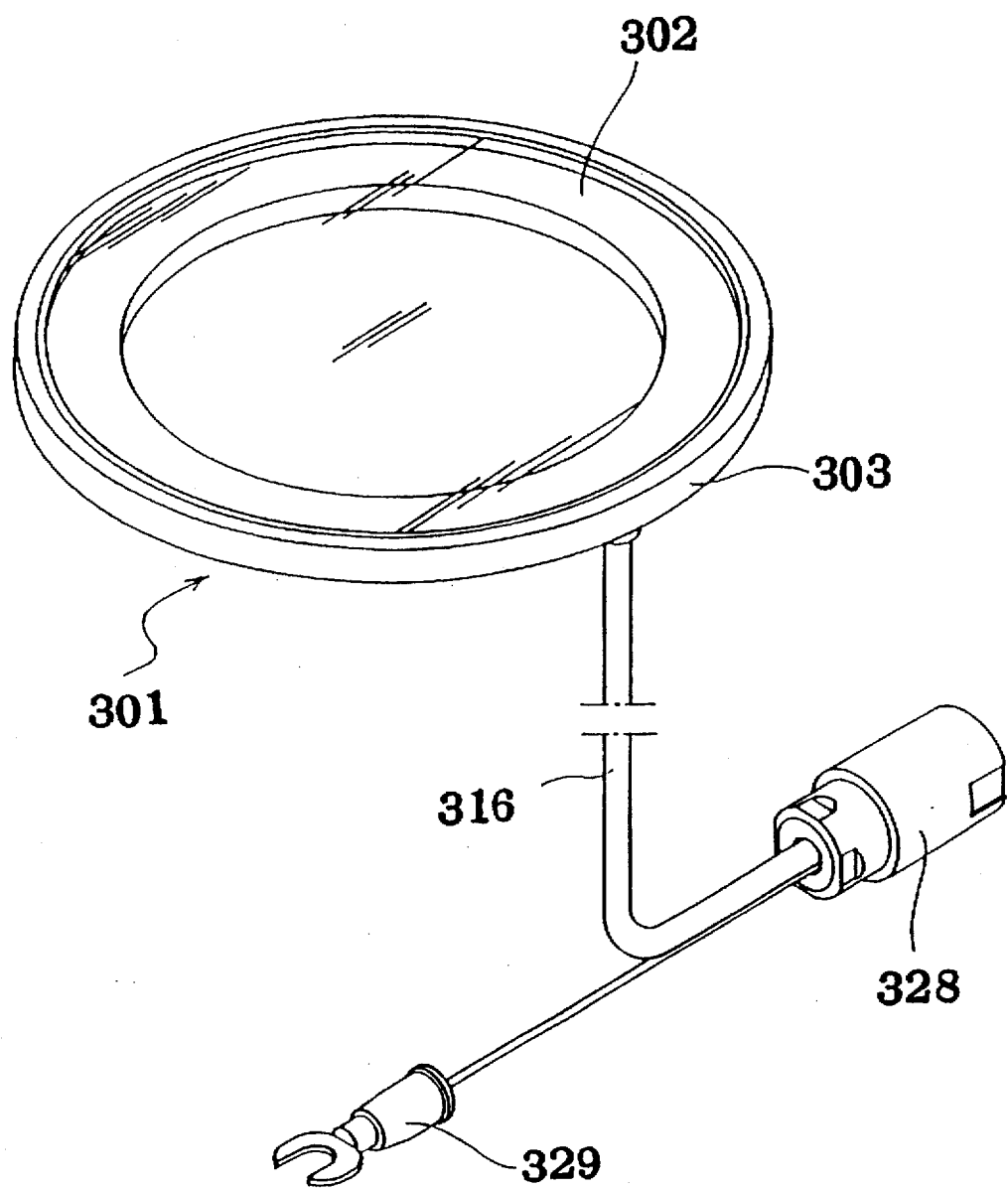
FIG. 28 is a perspective view of the transparent heating plate of another embodiment of this invention.
Figure 29:
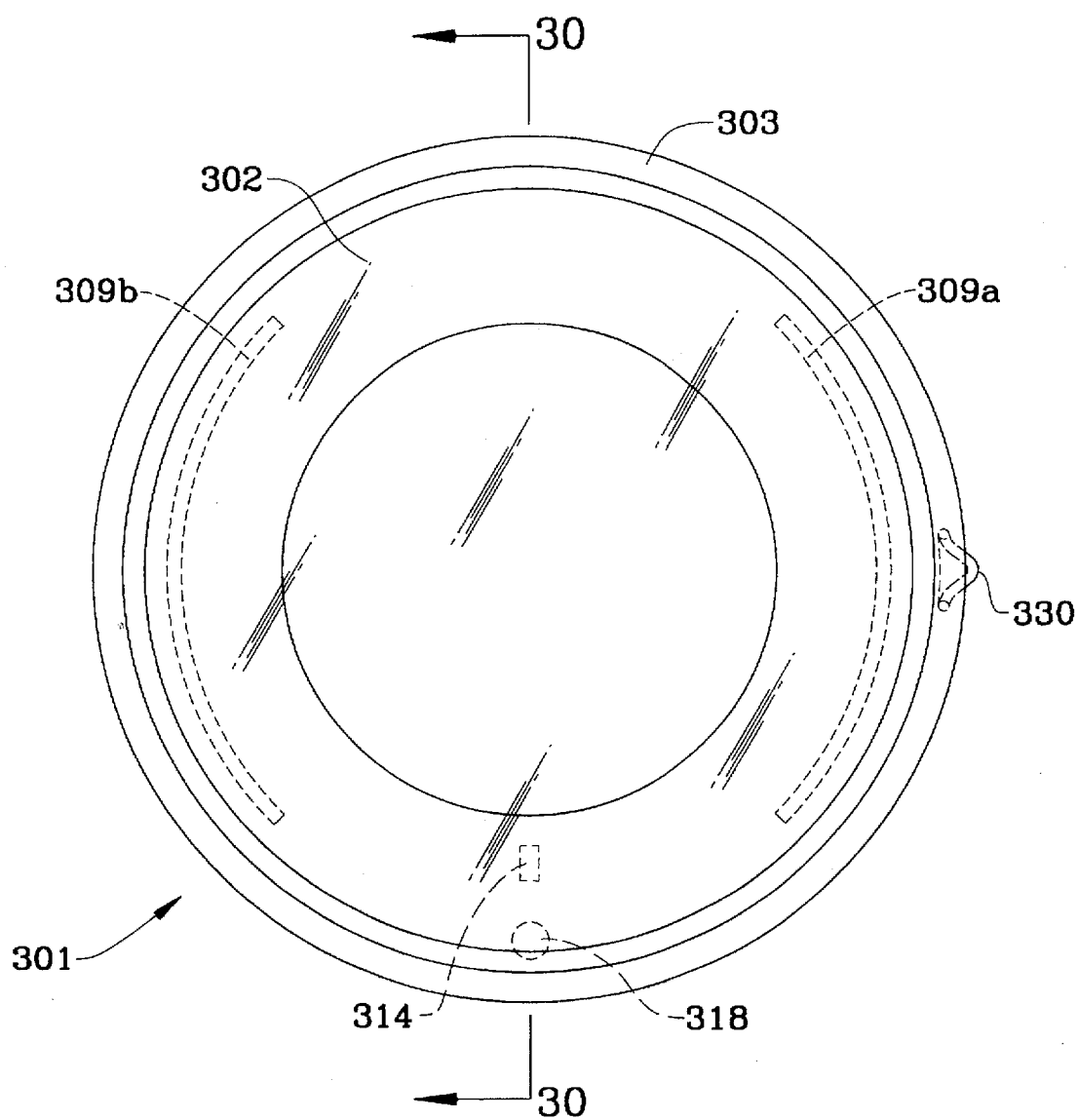
FIG. 29 is a perspective view of the transparent heating plate of another embodiment of this invention.
Figure 30:
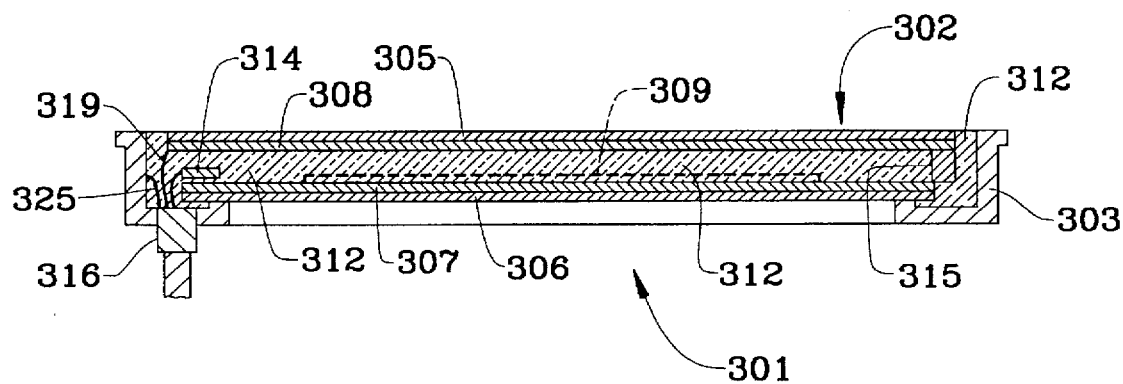
FIG. 30 is a cross-sectional view along the 30—30 line in FIG. 29.
Figure 31:
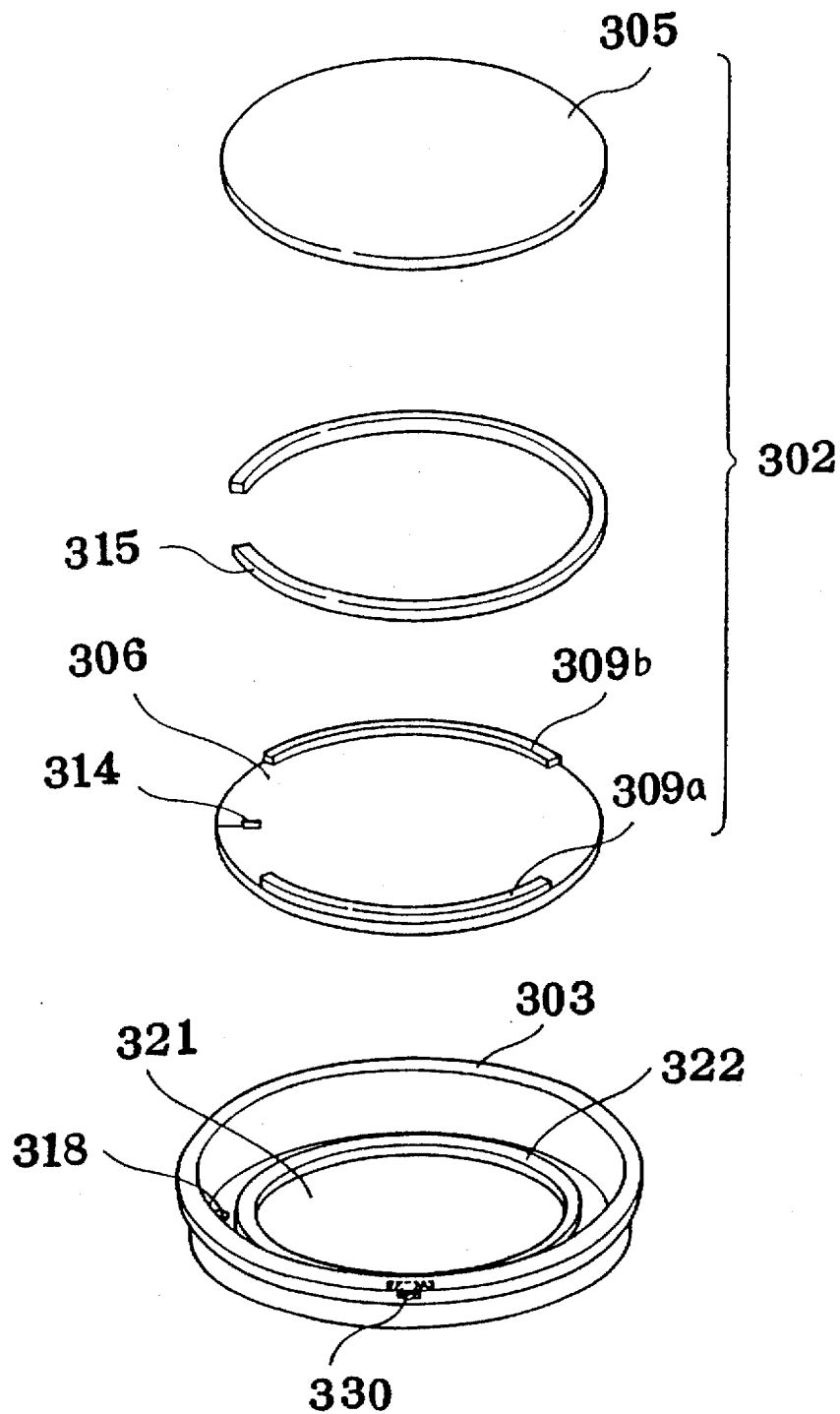
FIG. 31 is a perspective view which illustrates the parts used for the transparent heating plate of this invention.

Next, the transparent heating plate f another embodiment of this invention is described, FIG. 28 is a perspective view of the whole of the transparent heating plate for microscope of an embodiment of this invention. FIG. 29 is a plan view of the plate of the transparent heating plate for microscope of an embodiment of this invention. FIG. 30 is a sectional view along the 30—30 line in FIG. 29. FIG. 31 is a perspective view which illustrates the parts used for the transparent heating plate of this invention.

Figure 37:
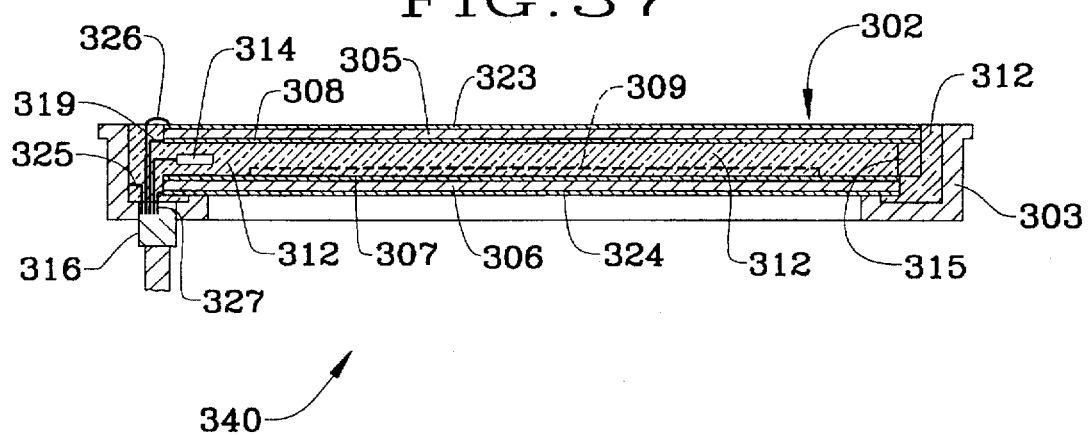
FIG. 37 is a plan view of the transparent heating plate of another embodiment of this invention.
Figure 38:
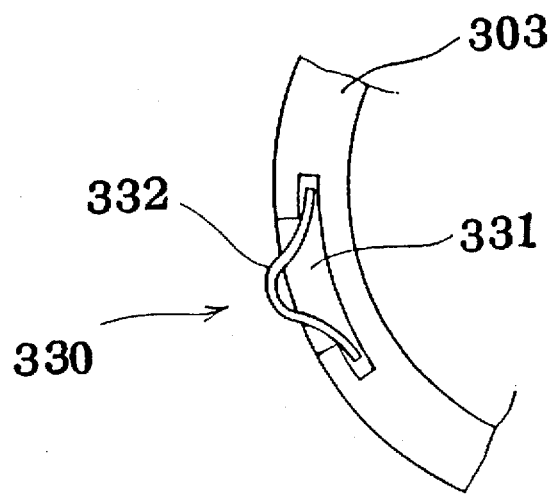
FIG. 38 is a diagram which illustrates the securing mechanism attached to the transparent heating plate of an embodiment of this invention.
Figure 39:
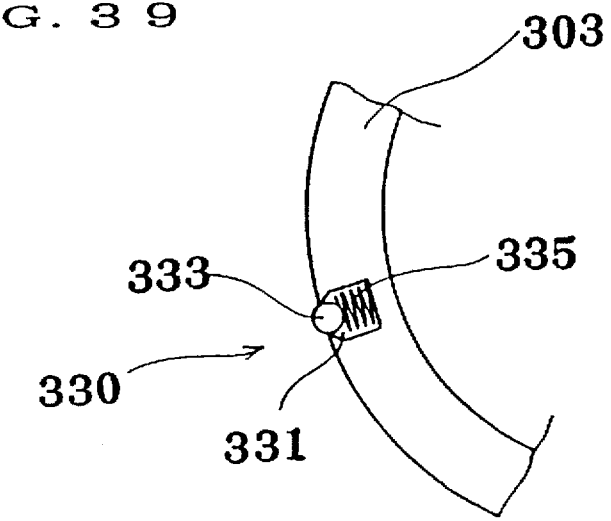
FIG. 39 is a diagram which illustrates the securing mechanism provided for the transparent heating plate of another embodiment of this invention.

Specifically, the transparent heating plate for microscope 301 comprises a housing 303, a transparent plate assembly 302 encased in the housing 303, a connector 328, and a grounding terminal 329, as shown in FIGS. 28 to 31. The transparent plate assembly 302, as shown in FIG. 30, comprises a first transparent plate 305 and a second transaparent plate 306, a spacer 15 put between the transparent plates 305 and transparent insulative filling material 312 filled between the transparent plates 305 and 306, a temperature sensor 314 put between the transparent plates 305 and 306, and connection wires. In this embodiment, the first transparent plate 305 and the second transparent plate 306 are of a circle. A transparent conductive film (transparent heating element) 307 is formed on almost the entire surface of the side of the second transparent plate which is opposite to the first transparent plate (the top side of the second transparent plate). A transparent conductive film 308 is formed on the bottom side (the side site to the second transparent plate) of the first transparent plate 305. Further a transparent conductive film 323 may be formed on the top side of the first transparent plate 305, as shown in FIG. 37 described later.

For the transparent plates, glass plates are preferable, but synthetic resin plates may be used. Any synthetic resin plates my be used without particular limitations if they have a transparency and an insulating property. Synthetic resin plates with a high transparency, such as acrylic plates, polycarbonate plates, and styrene plates are preferable. Hard synthetic resin plates are further preferable. A circle for the shape of the transparent plates here includes a true circle, an ellipse, and an elongated circle.

Figure 32:
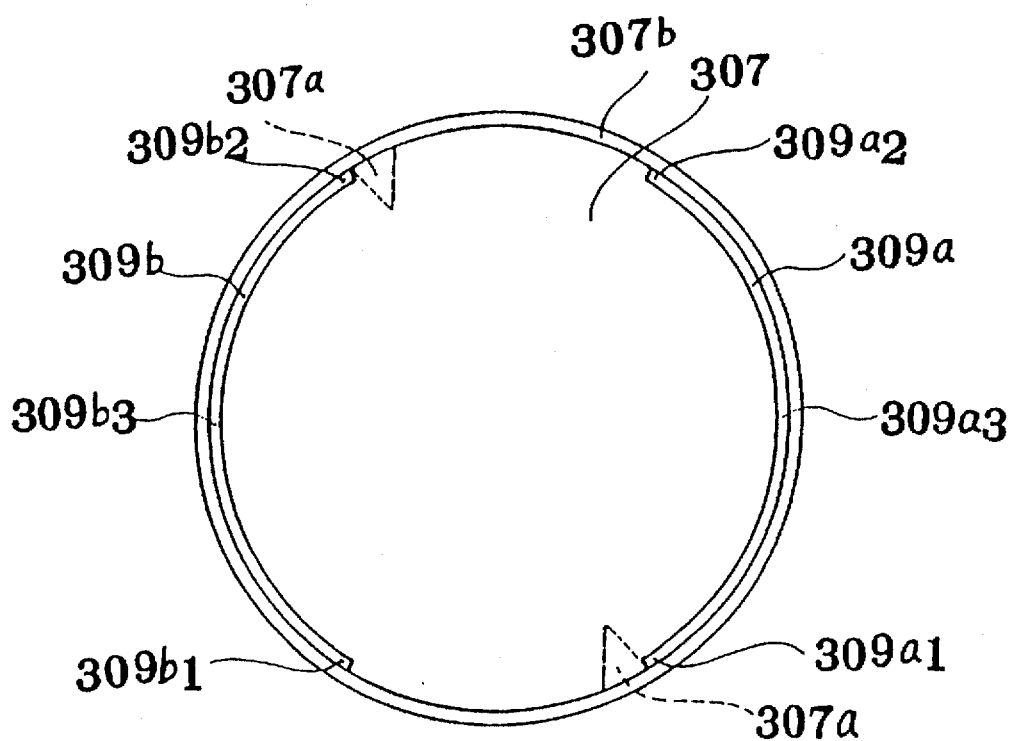
FIG. 32 is a plan view of the transparent plate with a transparent conductive film formed of an embodiment of this invention.

On the second transparent plate 306, two electrodes 309a and 309b for making the transparent conductive film generate heat, opposite to each other in arcs of about one third of the length of the entire circumference, are formed so as to fit to the circular shape, as shown in FIGS. 29, 31 and 32. On the transparent plate 306, two regions without an electrode, opposite to each other in arcs of the length greater than one sixth of the entire circumference are formed The temperature 314 is disposed at about the middle position of this region without an electrode. The length of the electrodes is preferably within the range of ¼ to ⅓ of the entire circumference.

The transparent conductive film 307 has a certain resistance though conductive, and generates heat when a an electric current is flowed in it. On the rate of heat generation, a conductive film that can heat the glass plate at above 20° C., preferably above 30° C., is preferable. Specifically, the transparent conductive film is formed of a conductive thin metal film. For the conductive thin metal film, one with the property of generating heat when an electric current is flown in it are used. Specifically, tin oxide, SiO2-indium alloy, indium oxide, tin- or antimony-doped indium oxide, and antimony-doped tin oxide can be preferably used. For the method of forming the conductive thin metal film on the inner side of the transparent plates 305 and 306, vapor deposition (vacuum deposition, for example), spattering, dipping, or CVD can be used. For the electrodes 309a and 309b, a thin film of a metal with a high conductivity such as copper and silver is preferably used. The conductive film not used as an heating element, for example, the transparent conductive film 23 may be a conductive film with a very low resistance, though may be the conductive film as described above.

The transparent conductive film 307 is conventionally formed uniformly over the entire transparent plate, and the resistance is uniform throughout the film. Resistance here is the value of resistance measured between the points spaced the same distance apart. The transparent conductive film 307 of this embodiment has high resistance regions 307a the resistance which is higher than that in the other part, between the adjacent ends of the opposite electrodes (between 309a1 and 309b1 and between 309a2 and 309b2), as shown in FIG. 32. Specifically, the transparent conductive film 307 has a first high resistance region 307a in the vicinity of one end (in the vicinity of 309a1) of one electrode 309a, and a second high resistance region 307b in the vicinity of the end (in the vicinity of 309b2) of the electrode 309b which is located opposite to the end of the electrode 309a with the central position (center) of the transparent plate 306 between. Therefore, the parts of the transparent conductive film between the adjacent ends of the opposite electrodes (between 309a1 and 309b1 and between 309a2 and 309b2) have a higher resistance than the other parts, particularly the part around the central part.

The rate of heat generation of the transparent conductive film is proportional to the electric current flowing in the transparent conductive film. On the other hand, an electric current flows more easily in a low resistance part than in a high resistance part. For this reason, in the circular plate, the distance between the electrodes is smallest between the adjacent ends, and a greater current flows in these parts (between 309a1 and 309b1 and between 309a2 and 309b2), causing a higher heat generation than the other parts. Because of this, the parts of the plate where the ends of the electrodes are located become of a higher heated state than the central part, and it is not possible to put the whole plate in a stable heated state.

Further, since the temperature sensor obstructs examination with a microscope, it is difficult to dispose the temperature sensor, and hence the temperature sensor is disposed at a position apart from the center. Therefore, measurement with the temperature sensor is performed near the circumference, and the central part where an object to be examined is actually mounted cannot be measured, If there is a circumference in the temperatures of these positions, desired measurement of temperature cannot be performed. Therefore, heat generation of the transparent conductive film between the opposite electrodes is made substantially uniform by intentionally forming a variation in the resistance of the transparent conductive film, for example, forming the transparent conductive film between the adjacent ends of the opposite electrodes (between 309a1 and 309b1 and between 309a2 and 309b2) so as to have a higher resistance than the other parts, particularly the central part, and adjusting the rate of heat generation (electric current) using the difference in the resistance.

Figure 33:
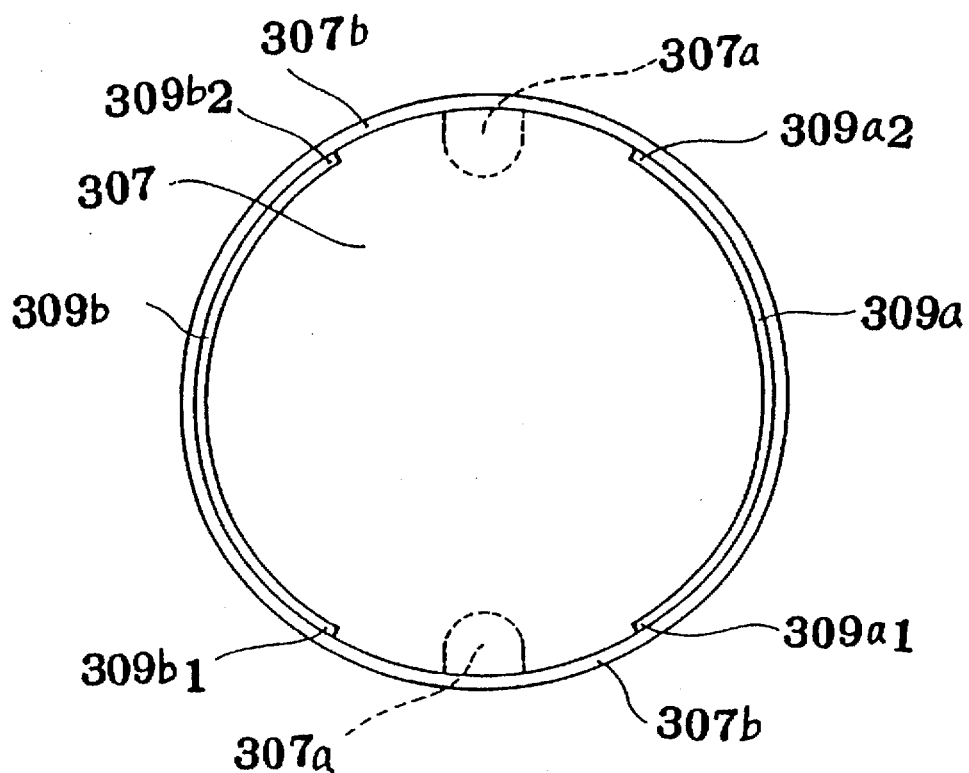
FIG. 33 is a plan view of the transparent plate with a transparent conductive film formed of another embodiment of this invention.

For the method of forming the high resistance regions, the method which partially removes the transparent conductive film 307 (a little polishing, for example) in the vicinity of one end of the electrode 309a (in the vicinity of 309a1) to form a high resistance region 307a, and similarly performs this in the vicinity of one end of the electrode 309b (in the vicinity of 309b2) is preferable, as shown in FIG. 32. For partial polishing of the transparent conductive film a method which completely removes predetermined parts of the transparent conductive film, and another method which polishes the transparent conductive film without completely removing are usable. The latter one is considered to be preferable. For the method of polishing, physical polishing, using a file or other means, and chemical polishing that partially dissolves off the transparent conductive film with a solution dissolving the material of the transparent conductive film (for example, nitric acid, and particularly one not dissolving the transparent plate is preferable) are usable. Further, the position to form the high resistance regions at may be the middle position between the adjacent ends of the opposite electrodes (between 309a1 and 309b1 and between 309a2 and 309b2), as shown in FIG. 33.

For the specific method of adjusting the resistance, in other word, the method of forming the high resistance regions; it is preferable to measure the resistance between the middle portions of the electrodes in advance, and then, measuring the resistance between the adjacent ends of the opposite electrodes (between 309a1 and 309b1 and between 309a2 and 309b2), gradually polish off those parts of the transparent conductive film. By this, the transparent conductive film 307 is formed so that the resistance between each end of one electrode (309a1 and 309a2) and the end of the other electrodes (309a1 and 309b2) adjacent to the end of the former electrode (between 309a1 and 309b1 and between 309a2 and 309b2) is substantially equal to the resistance between the middle portion 309a3 of one electrode 309a and the middle portion 309b3 of the other electrode 309b. Substantially equal here includes up to 10 percent of difference, though exact equality is ideal Further, the resistance between the two adjacent ends of the opposite electrodes are also formed substantially equal to each other. That is, the resistance between 309a1 and 309a1 and that between 309a2 and 309b2 are also formed substantially equal to each other. If forming of the high resistance regions may cause the difference in the transparency between those regions and the other parts, the positions to form those high resistance regions at are preferably near the circumference at which they rarely obstruct the examination with a microscope, as shown in FIG. 32.

Figure 34:
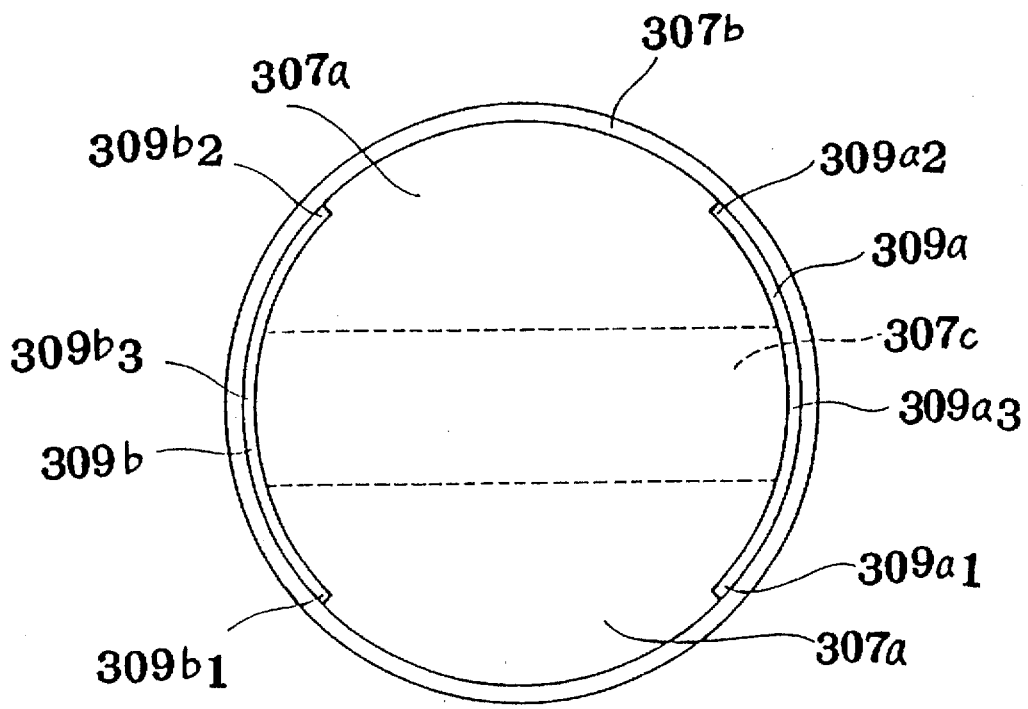
FIG. 34 is a plan view of the transparent plate with a transparent conductive film formed of another embodiment of this invention.
Figure 35:
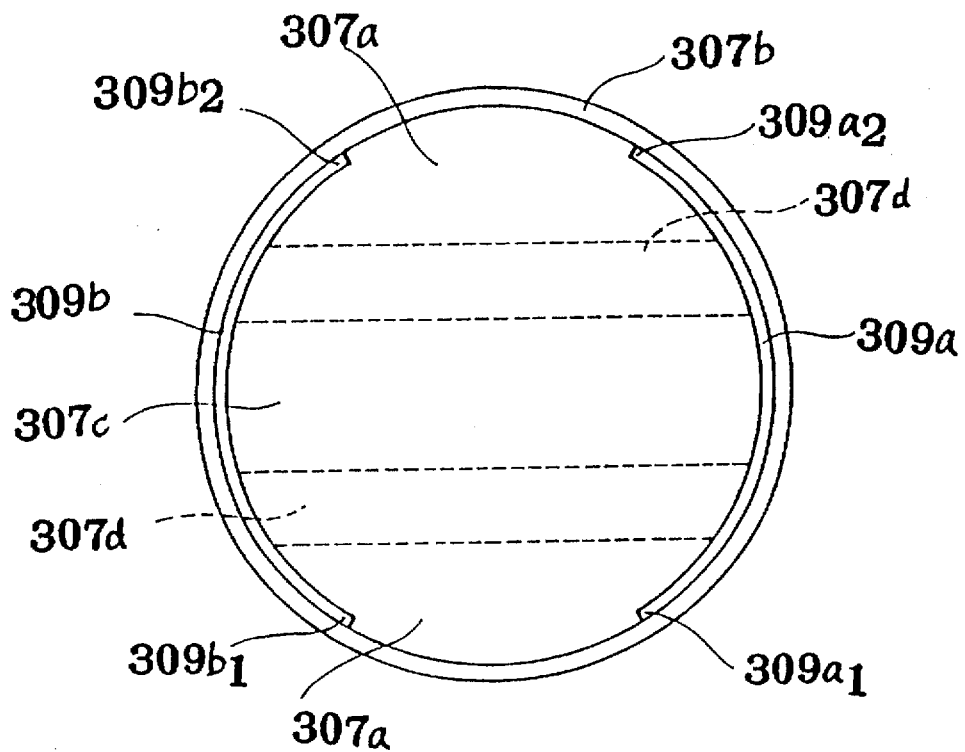
FIG. 35 is a plan view of the transparent plate with a transparent conductive film formed of another embodiment of this invention.

The transparent conductive film 307 may be formed so that the resistance of the central part between the middle portion of one electrode and that of the other electrode is smaller, and so that the resistance of the other parts is greater than that of the central part, as shown in FIG. 34. Specifically, this transparent conductive film has a band-shaped low resistance region 307c formed at the central part, and two band-shaped high resistance regions 307a formed so as to put the low resistance region 307c between them. The resistance of the two high resistance regions is almost the same. By thus forming, the transparent conductive film 307 can be made such that the resistance between the adjacent ends of the opposite electrodes is substantially equal to the resistance between the middle portions of the opposite electrodes. Further, between the low resistance region 307c and the high resistance regions 307a, intermediate resistance regions 307d with a resistance intermediate between the resistance of both regions may be formed, as shown in FIG. 35. The high resistance regions 307a are formed so as to be almost equal to each other, and the intermediate resistance regions 307d are formed so as to be equal to each other. By thus forming, the resistance of the transparent conductive film is made to be approximately equal. The high resistance regions 307a, low resistance region 307c, and intermediate resistance regions 307d are parts of the transparent conductive film and formed so as to be transparent.

For the method of forming such a transparent conductive film with different resistance in parts, a first transparent conductive film necessary for forming the high resistance part is first formed. Next, a second transparent conductive film in the shape of a band of a predetermined width is formed on the first transparent conductive film. Since the second transparent conductive film is superposed on the first transparent conductive film, the transparent conductive film becomes thicker at the part where the second transparent conductive film is formed, and the resistance decreases. When forming the intermediate resistance regions, a first transparent conductive film necessary for forming the high resistance part is first formed. Next, a second transparent conductive film in the shape of a band of a predetermined width is formed on the first transparent conductive film. Further, a third transparent conductive film narrower than the band of the second transparent conductive film is formed on the second transparent conductive film. In this case too, the transparent conductive film 307 is formed so that the resistance between the adjacent ends of the opposite electrodes is substantially equal to the resistance between the middle portions of the opposite electrodes. Substantially equal here includes up to 10 percent of difference, though exact equality is ideal.

Figure 36:
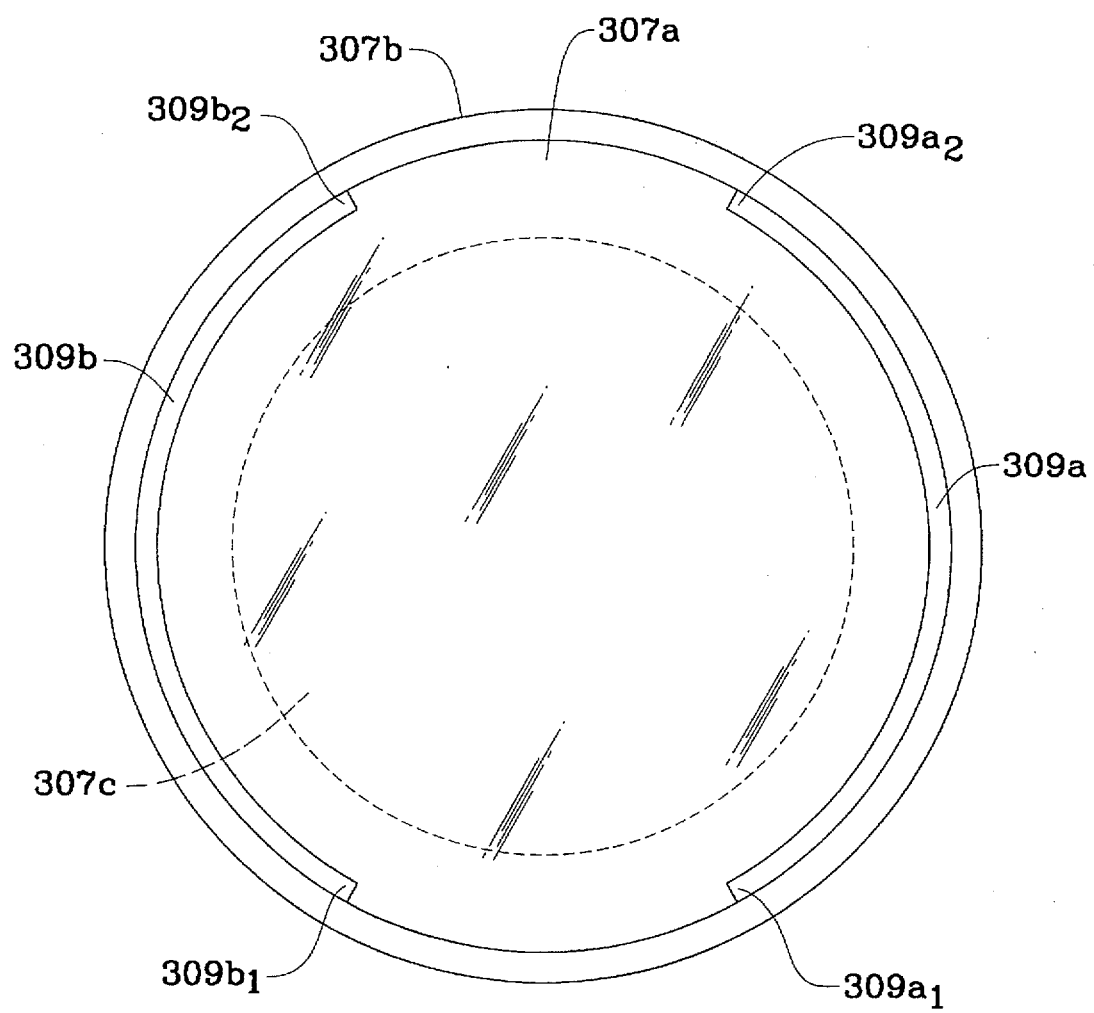
FIG. 36 is a plan view of the transparent-plate with a transparent conductive film formed of another embodiment of this invention.

The transparent conductive film 307 may be one which has a circular or polygonal low resistance region 307c formed at the center, and a ring-shaped high resistance region 307a formed so as to surround the low resistance region 307c, as shown in FIG. 36. By thus forming, the transparent conductive film 307 can be made such that the resistance between the adjacent ends of the opposite electrodes is substantially equal to the resistance between the middle portions of the opposite electrodes. Further, between the low resistance region and the high resistance region, a ring-shaped intermediate resistance region with a resistance intermediate between the resistance of both regions may be formed. The shape of the low resistance region may be a polygon such as 4 to 24-gon, preferably 4 to 8-gon, and a circle such as a true circle, ellipse, and elongated circle For the method of forming such a transparent conductive film with different resistance in parts, a first transparent conductive film necessary for forming the high resistance part is first formed. Next, a second transparent conductive film in the shape of a circle or polygon is formed on the first transparent conductive film so that its center is placed at the center of the transparent plate. Since the second transparent conductive film is superposed on the first transparent conductive film, the transparent conductive film becomes thicker at the part where the second transparent conductive film is formed, and hence the resistance decreases. When forming the intermediate resistance region, a first transparent conductive film necessary for forming the high resistance part is first formed. Next, a second transparent conductive film of a predetermined size is famed on the first transparent conductive film. Further, a third transparent conductive film of a predetermined area smaller than that of the second transparent conductive film. In this case too, the transparent conductive film 307 is formed so that the resistance between the adjacent ends of the opposite electrode is substantially equal to the resistance between the middle of the opposite electrodes. Substantially equal here includes up to 10 percent of difference, though exact equality is ideal.

When forming such that the shape of the low resistance region is a circle and lines connecting the ends of the electrodes are is substantially tangent lines to the low resistance region under the conditions that the shape of the transparent conductive film surrounded by electrodes is substantially a true circle with a radius of 50 mm, and the size of each electrode is one third of the circumference of the transparent conductive film, the radius of the high resistance region is 50 mm and that of the low resistance region becomes $25\sqrt{3}$ mm. By determining the resistance of the resistance to be about 0.423 for the supposed resistance of the high resistance region of 1, the resistance between the adjacent ends of the opposite electrodes is substantially equal to the resistance between the middle portions of the opposite electrodes. When forming such that the shape of the low resistance region is a circle and the lines connecting the ends of the electrodes are substantially tangent lines to the low resistance region under the same conditions as given above except that the size of the electrodes is one fourth of the circumference of the transparent conductive film, the radius of the high resistance region is 50 mm and that of the low resistance region becomes $\sqrt{1250}$ mm. By determining the resistance of the resistance to be about 0.586 for the supposed resistance of the 1 high resistance region of 1, the resistance between the adjacent ends of the opposite electrodes is substantially equal to the resistance between the middle portions.

In this embodiment, the transparent plate 306 has a region 307 without a transparent conductive film at the peripheral part on the entire circumference. The electrodes 309a and 309b are also disposed at a position a predetermined distance inward from the circumference of the transparent plate 306. Since the sides of the electrodes and the transparent conductive film are inward apart from the circumference of the transparent plate 306, in other words, regions without a transparent conductive film and an electrode are formed in the peripheral part of the transparent plate on the entire circumference, electromagnetic waves generated from the electrodes and the transparent conductive film are prevented from being radiated out of the circumference of the transparent plate 306. Therefore, electromagnetic waves (noises) generated from the electrodes and the transparent conductive film, if generated, more strike the peripheral parts of the first transparent plate 305 above the transparent plate 306, and hence radiation of the generated electromagnetic waves to the outside is better prevented. The distance between the sides of the transparent plate 206 and those of the transparent conductive film 307 and the electrodes 309a and 309b is preferably within the range of about 0.5 to 10 particularly preferably 1 to 5 mm. The transparent heating element consisting of the transparent conductive film and the electrodes may be disposed on the bottom side (the side opposite to the second transparent plate) of the first transparent plate, though disposing it on the second transparent plate as described above is preferable.

In this embodiment, as shown in FIG. 30, a transparent conductive film 308 is formed on the bottom side (the side opposite to the second transparent plate) of the first transparent plate 305 too. A grounding wire 19 is connected to the transparent conductive film 308 formed off the first transparent plate 305. Electromagnetic waves striking the conductive film 308 on the bottom side of the first transparent plate flow into the grounding wire and disappear. The transparent plates 305 and 306 are held apart about a uniform distance throughout the whole part by a spacer 15 disposed at the circumferences of the transparent plates 305 and 306. The transparent conductive films are prevented from short-circuiting by the transparent insulative filling material 312 and the spacers 15, it is also possible to, dispose the transparent heating element consisting of the transparent conductive film and the electrodes on the bottom side as described above and to form a transparent conductive film with a grounding wire connected at the top side of the second transparent plate. However, by thus disposing the transparent plate with a transparent conductive film with a grounding wire connected at the top side as in the embodiment shown in the Figures, if electromagnetic waves are generated from the electrodes or the conductive film below and spread upward, they strike the conductive film above and hence are prevented from spreading outside, preferably. Further, the lower transparent plate 306 may be formed smaller than the upper transparent plate 305. By thus forming, electromagnetic waves generated from the peripheral parts of the transparent plate 306 (sides of the electrodes and the conductive film) more strike the peripheral parts of the transparent plate 305, and hence radiation of the generated electromagnetic waves to the outside is better prevented.

In the transparent heater plate, as described above, transparent heater plate is heated using the heat generation of the transparent conductive film caused by flowing an electric current in the transparent conductive film. Because of this, electromagnetic waves (noises) can be generated from the electrodes connected to the transparent conductive film or other parts. If the electromagnetic waves flow in the object examined, they may change the property of the object. Constructing as described above is effective for solving this problem.

It is also possible to construct as the embodiment shown in FIG. 37. The transparent heater plate 340 of this embodiment has a transparent conductive film 323 formed on the top aide (exposed surface) of the first transparent plate 305, and a transparent conductive film 324 formed on the bottom side (exposed surface) of the second transparent plate 306, in addition to those shown in FIG. 30. In other words, the exposed surfaces of the transparent heater plate 2 are covered with a transparent conductive film. Further, grounding wires 326 and 327 are connected to these transparent conductive films 323. The grounding wires 319, 323 and 324 may be replaced with a common grounding wire. By this, electromagnetic waves striking the top side of the first transparent plate and the bottom side of the second transparent plate flow in the transparent conductive film and grounding wire and disappear. Therefore, it is possible to make electromagnetic waves coming from the outside disappear. Further, this electromagnetic wave-suppressing transparent heater plate is not limited to a circular-shaped one described above. For example, the plate (transparent plate) may be a polygon square, rectangle, and 5 to 8-gon). In that case, the transparent conductive film for heating generation may have a uniform resistance throughout the whole part without the structure such as the one that changes the resistance as described above. For the insulative transparent material 312, materials with an insulating capability, transparency, and adhesive property to the transparent plates are preferably used. By using such a materiel with an adhesive property to the transparent plates, when glass plates are used for the transparent plates, scattering of broken pieces of glass is prevented if glass plates break.

The transparent material 312 preferably has a adhesive property to the temperature sensor 314 and moreover the spacer 315. By using such a material, an accurate measurement of temperature is made possible because separation between the temperature sensor and the transparent material is decreased. For this transparent material, silicone resin, polyurethane resin, and epoxy resin can be used. For the transparent plate material 312, silicone resin is more preferable because of its insulating capability and stability. Silicone resin includes silicone gel and silicone rubber. Of silicone rubber, RTV silicone rubber and LTV silicone rubber with an adhesive property are preferable. Either one-liquid type or two-liquid type may be used. Specifically, product name KE109 (two-liquid type RTV silicone rubber, Shin'etu Chemical) is preferable.

The temperature sensor 314 is surrounded by the transparent material 312 so that it is held between the glass plates 305 and 306 without contact with the transparent conductive film 307 and its position does not easily move. That is, the temperature sensor 314 is secured by the transparent material 312. By thus constructing, since the position of the temperature sensor does not move and the temperature sensor is not put in contact with the transparent conductive film, an accurate measurement of temperature can be performed. For the temperature sensor 314, any device with which the temperature can be detected may be used without particular limitations. A thermocouple and a thermistor are preferable.

The housing 303 has a hole 321 formed at the center, a transparent plate assembly mounting part 322 formed so as to surround the hole 321, and a small hole 318 for passing the wires connected to the electrodes and the temperature sensor and grounding wires through, as shown in FIGS. 30 and 31. Further, the housing 303, at least its surface, preferably has an electrical conductivity. For the purpose, the method that forms the whole body of the housing 303 of an electrically conductive material and the method that treats the surface of the housing 303 to impart a conductivity are usable. In the former method, it is attained by forming the housing of an electrically conductive metal or an electrically conductive synthetic resin, for example. In the latter method, it is attained by applying a conductive paint or vapor-depositing a conductive metal. It is preferable to connect a grounding wire 325 to a thus electrically conductive housing 203 as shown in FIG. 30. By thus constructing, when electromagnetic waves generated by the electrodes or the transparent heating element or coming from the outside strike the housing, the electromagnetic waves flow on the grounding wire connected to the housing and disappear. Therefore, it can prevent electromagnetic waves from flowing into the object examined mounted on the transparent plate.

The wires connected to the electrodes and the temperature sensor and the grounding wire are bound into a cord 316 and extended outside through the small hole 318 in the housing 303. The code 316 is fitted with a connector 328 at the end. Further, a grounding terminal 329 is attached to the connector 328. This connector 328 forms the connection terminal connected to the temperature controller described later.

This transparent heating plate for microscope is used being attached to the stage of a microscope. Therefore, it is preferable to provide the housing with a securing mechanism 330 for preventing a play when being attached to the stage, as shown in FIGS. 29 and 31. For the securing mechanism, one with a resilient member which is pressed between the plate and the stage when the plate is attached to the stage is preferable. The securing mechanism 330 of this embodiment comprises a groove 331 formed in the top side of the housing and a strap-shaped resilient member 332 (a resilient metal, for e ample) fitted in the groove. The middle portion of the strap-shaped resilient member 332 projects outside (outside of the housing). When attached to the stage of a microscope, this strap-shaped resilient member is pressed between the stage and the housing and deforms inward pressing the part opposite to the strap-shaped resilient member to the stage, and thereby prevents a play between them. The position to which the securing mechanism is attached is determined, taking the shape of the stage into consideration. It is not limited to the large-diameter portion at the upper part of the housing as in this embodiment, and may be attached to the circumferential surface of the small-diameter portion below the large-diameter portion. The securing mechanism is not limited to the flat spring structure as described above. For example, one consisting of a ball 333 fitted in a groove 331 and a resilient member 335 (a spring, for example) which presses the ball outward may be used. Further, two or more securing mechanisms can be attached. Furthermore, this stable attached state type of transparent plate is not limited to the circular-shaped one as described above. For example, the plate (transparent plate) may be a polygon (square, rectangle, and 5 to 8-gon. In that case, the transparent conductive film for heating generation may have a uniform resistance throughout the whole part without the structure such as the one that changes the resistance as described above.

In the above description, explanation is using embodiments as application of the transparent heater plate of this invention to a transparent heater plate for microscope, but not limited to this. It can be used for heating tissue culture dish (Schale, for example), for example. There are occasions when it is necessary to perform cultivation continually observing the tissue culture dish. In such occasions, if the tissue culture dish is put in an incubator and heated, observation from the outside is not possible. However, when the transparent heater plate of this invention is used, it is possible to mount on it and heat the tissue culture dish, heating and observation can be simultaneously. Further, since it is transparent, the color of the object and the like can be identified without a mistake. Further, though a circular transparent heater plate, the transparent conductive film located between the electrodes can be made to heat without a significant difference in temperature, uniform heating of the tissue culture dish is possible, allowing a good cultivation.

The temperature heating device of this invention comprises the transparent heater plate 301 and the temperature controller 251. The temperature controller is shown in FIG. 27 and described above.

APPLICABILITY TO INDUSTRY

The transparent heating plate of this invention comprises a first transparent heating element, a pair of electrodes for first transparent heating element connected to the first transparent heating element and opposite to each other, a second transparent heating element, and a pair of electrodes for second transparent heating element connected to the first transparent heating element and opposite to each other, the center line of the opposite electrodes for second transparent heating element is disposed so as to intersect the center line of the opposite electrodes for first transparent heating element substantially at right angles. Therefore, it can heat the central part used in examination of the transparent heater plate at almost a uniform temperature, without effect of the shape of the transparent heater plate (if a circle, for example) or the forms of the plate such as a through hole in the transparent heater plate.

Further, the transparent heating plate of this invention comprises a transparent heating element and a pair of electrodes for transparent heating element connected to the transparent heating element and opposite to each other, and has a region without an electrode on the entire circumference in the peripheral part of the transparent plate with the transparent heating element formed. The electrodes are also disposed inward apart from the circumference of the transparent heater plate. Therefore, it can prevent electromagnetic waves generated from the transparent heating plate from flowing into the object examined, and exerts less effect of electromagnetic waves on the object.

The transparent heating plate of this invention comprises a first glass plate and a second glass plate put opposite to the firs glass plate in superposition with a space of predetermined distance, an insulative transparent material with an adhesive property to the first and second glass plates being filled between them. Therefore, broken pieces of glass does not easily scatter if the glass plates are broken.

The transparent heating plate of this invention comprises a first transparent conductive film provided with a pair of electrodes and a second transparent conductive film which is opposite to the transparent conductive film and has a grounding wire connected. Therefore, it can prevent electromagnetic waves generated from the transparent heating plate from flowing into the object examined, and exerts less effect of electromagnetic waves on the object.

The transparent heating comprises a transparent conductive film formed on a circular plate and a pair of electrodes for heating element connected to the transparent conductive film. The transparent conductive film is formed so that the resistance between the adjacent ends of the opposite electrodes and the resistance between the middle portions of the opposite electrodes are substantially equal to each other. Therefore, though a circular transparent heater plate, it can make the transparent conductive film between the electrodes heat without a significant difference in temperature, allowing the object to be heater under a good temperature environment.

What is claimed is:

1. A transparent heating plate comprising a transparent plate assembly which comprises a first transparent plate, a second transparent plate put opposite to the first transparent plate apart with a space of predetermined distance, and a transparent insulative material filled between the first and second transparent plates and a housing which holds the peripheral part of the transparent plate assembly, characterized in that:

said first transparent plate has a first transparent heating element formed on either side and a pair of electrodes for first heating element connected to the first transparent heating element and disposed opposite to each other;

the second transparent plate has a second transparent heating element formed on either side and a pair of electrodes for second heating element connected to the second transparent heating element and disposed opposite to each other; and the center line of the opposite electrodes for the second heating element is oriented so as to intersect the center line of said opposite electrodes of first heating element substantially at right angles.

2. The transparent heating plate of claim 1, wherein said transparent plate assembly is of a circle.

3. The transparent heating plate of claim 1, wherein said transparent plate assembly has a through hole formed substantially at the center.

4. The transparent heating plate of claim 1 wherein said transparent plate assembly has a temperature sensor for detecting the temperature of said transparent heating plate.

5. A transparent heating device comprising said transparent heating plate for microscope of claim 4 and a temperature controller which controls the temperature of the transparent heating elements of the transparent heating plate using the temperature signal detected by said temperature sensor.

6. A transparent heating plate comprising a transparent plate assembly which comprises a first transparent plate, a second transparent plate put opposite to the first transparent plate apart with a space of predetermined distance, and a transparent insulative material filled between the first and second transparent plates and a housing which holds the peripheral part of the transparent plate assembly, characterized in that:

a transparent conductive film is formed on both of the opposite inner sides of said first and second transparent plates, a pair of electrodes for heating the conductive film are formed on either one of said sides so as to be connected to the transparent conductive film and disposed opposite to each other, and a grounding wire is connected to the transparent conductive film on the other side.

7. The transparent heating plate of claim 6, characterized in that at least the outer surface of said housing has a conductivity and a housing grounding wire is connected to said housing.

8. The transparent heating plate of claim 6, wherein a region without the transparent conductive film is formed on the entire circumference in the peripheral part of said transparent glass plate with said electrodes for heating conductive film formed, and said electrodes are disposed inward apart from the circumference of said transparent plate assembly.

9. The transparent heating plate of claim 6, wherein said transparent heating plate has a temperature sensor for detecting the temperature of said transparent plate assembly.

10. A transparent heating device comprising said transparent heating plate of claim 9 and a temperature controller provided with a temperature control mechanism which controls the temperature of the transparent conductive film of the transparent heating plate using the temperature signal detected by said temperature sensor, said temperature control mechanism performing the temperature control by adjusting the applied voltage or applied current according to the temperature signal detected by said temperature sensor.

11. A transparent heating plate comprising a circular transparent plate assembly which comprises a circular first transparent plate, a circular second transparent plate put opposite to the first transparent plate apart with a space of predetermined distance, and a transparent insulative material filled between the first and second transparent plates and a housing which holds the peripheral part of the transparent plate assembly, characterized by further comprising:

a transparent conductive film formed on either side of said first or second transparent plate; and a pair of curved electrodes for heating the element connected to the transparent conductive film and formed opposite to each other on or near the circumferential part of the transparent plate;

said transparent conductive film being smaller in resistance between the middle part of one electrode and the middle part of the other electrode and greater in resistance of the other part than of the central part.

12. The transparent heating plate of claim 11, wherein said transparent conductive film has a high resistance regions the resistance of which is higher than the other part formed between the adjacent ends of the opposite electrodes at both end sides.

13. The transparent heating plate of claim 12, wherein said transparent conductive film has a first high resistance region the resistance of which is higher than the other part formed near an end of one electrode and a second high resistance region the resistance of which is higher than the other part formed near the end of the other electrode opposite to said end of one electrode with the center of the transparent plate between.

14. The transparent heating plate of claim 11, wherein said transparent conductive film has a first high resistance region formed at the middle part between the adjacent ends of the opposite electrodes at one end side and a second high resistance region formed at the middle part between the adjacent ends of the opposite electrodes at the other end side.

15. The transparent heating plate of claim 11, wherein said transparent conductive film has a strip-shaped low resistance region in the central part and two high resistance regions formed with the strip-shaped low resistance region between.

16. The transparent heating plate of claim 11, wherein said transparent conductive film has a circular or polygonal low resistance region formed at the central part and a ring-shaped high resistance region formed so as to surround the low resistance region.

17. The transparent heating plate of 11, wherein said transparent heating plate has a temperature sensor disposed substantially at the middle position between the adjacent ends of the opposite electrodes.

* * * * *

UNITED STATES PATENT AND TRADEMARK OFFICE
CERTIFICATE OF CORRECTION

PATENT NO. : 5,717,190
DATED : February 10, 1998
INVENTOR(S) : Tamotsu INOUE

It is certified that error appears in the above-identified patent and that said Letters Patent is hereby corrected as shown below:

On the title page:

In item [57], delete the current abstract and insert the following abstract which was entered by an Examiner's Amendment on March 31, 1997:

-- A transparent heating plate including a housing which holds the peripheral part of a transparent plate assembly including a first transparent plate, a second transparent plate put opposite to the first transparent plate in superposition with a space of predetermined distance, and a transparent insulative material filled between the two transparent plates. Each transparent heating plate has a transparent heating device (transparent conductive film) and a pair of electrodes. The center line of the opposite electrode for the second heating elements is oriented so as to intersect the center line of the opposite electrodes of the first heating element at substantially right angles. A temperature sensor and controller detect and control the temperature of the heating elements. --

In Column 2, line 11, delete "IN" and insert -- in --.

In Column 2, line 37, after "as" insert -- shown in the J.P.A.62(1987)-135,803. This heating devices comprises a heater --.

In Column 4, line 3, delete "fire" and insert -- film --.

In Column 7, line 38, after "the" and before "circumference.", insert -- entire --.

In Column 7, line 42, delete "fitch" and insert -- fifth --.

In Column 7, line 53, delete "SiO2-mdium" and insert -- SiO2-indium --.

In Column 7, line 53, delete "radium" and insert -- indium --.

UNITED STATES PATENT AND TRADEMARK OFFICE
CERTIFICATE OF CORRECTION

PATENT NO. : 5,717,190
DATED : February 10, 1998
INVENTOR(S) : Tamotsu INOUE

It is certified that error appears in the above-identified patent and that said Letters Patent is hereby corrected as shown below:

In Column 8, line 38, delete "A/D)" and insert -- A/D --.
In Column 9, line 11, delete "se" and insert -- set --.
In Column 9, line 17, delete "the (first occurrence)" and insert -- this --.
In Column 10, line 37, delete "an".
In Column 11, line 65, after "described" insert -- . --.

In Column 12, line 39, delete "f in" and insert -- from --.
In Column 12, line 46, delete "trans, parent" and insert -- transparent --.
In Column 13, line 63, delete "code" and insert -- cord --.
In Column 13, line 67, delete "transaparent" and insert -- transparent --.

In Column 23, line 2, delete "code" and insert -- cord --.

Signed and Sealed this

Third Day of November, 1998

Attest:

BRUCE LEHMAN

*Attesting Officer*    *Commissioner of Patents and Trademarks*